United States Patent [19]

Engeler

[11] Patent Number: 5,140,531
[45] Date of Patent: Aug. 18, 1992

[54] ANALOG NEURAL NETS SUPPLIED DIGITAL SYNAPSE SIGNALS ON A BIT-SLICE BASIS

[75] Inventor: William E. Engeler, Scotia, N.Y.

[73] Assignee: General Electric Company, Schenectady, N.Y.

[21] Appl. No.: 561,404

[22] Filed: Aug. 1, 1990

[51] Int. Cl.$^5$ .............................................. G06F 15/18
[52] U.S. Cl. .................... 395/24; 364/602; 395/27
[58] Field of Search .............. 364/513, 807, 602; 307/201, 464, 465, 529

[56] References Cited

U.S. PATENT DOCUMENTS

| | | | |
|---|---|---|---|
| 4,156,284 | 5/1979 | Engeler | 364/862 |
| 4,807,168 | 2/1989 | Moopenn et al. | 364/602 |
| 4,866,645 | 9/1989 | Lish | 364/602 |
| 4,873,661 | 10/1989 | Tsividis | 364/807 |
| 4,903,226 | 2/1990 | Tsividis | 364/807 |
| 4,931,674 | 6/1990 | Kub et al. | 307/529 |
| 4,942,367 | 7/1990 | Milkovic | 330/9 |
| 4,988,891 | 1/1991 | Mashiko | 307/201 |

OTHER PUBLICATIONS

Kub et al., "Programmable Analog Vector-Matrix Multipliers", IEEE Jour. Solid-State Circuits, vol. 25(1), Feb. 1990, pp. 207-214.

Bloomer et al., "A Preprogrammed Artificial Neural Network Architecture in Signal Processing", Proceedings IEEE 1990 Custom Integrated Circuits, May 1990, pp. 1-3.

Schwartz et al., "A Programmable Analog Neural Network Chip", IEEE Jour. Solid State Circuits, vol. 24(3), Apr. 1989, pp. 688-697.

Eberhardt et al., "Design of Parallel Hardware Neural Network Systems from Custom Analog VLSI, 'Building Block' Chips", IJCNN 1989 vol. 2, pp. II 14 183-II-190.

Primary Examiner—Michael R. Fleming
Assistant Examiner—Robert W. Downs
Attorney, Agent, or Firm—Allen L. Limberg; James C. Davis, Jr.; Marvin Snyder

[57] ABSTRACT

Plural-bit digital input signals to be subjected to weighted summation in a neural net layer are bit-sliced; and a number N of respective first through $N^{th}$ weighted summations of the bits of the digital input signals in each bit slice are performed, resulting in a respective set of first through $N^{th}$ partial weighted summation results. Weighted summations of the partial weighted summation results of similar ordinal number are then performed to generate first through $N^{th}$ final weighted summation results. Each weighted summation of a bit slice of the digital input signals is performed using a capacitive network that generates partial weighted summation results in the analog regime. In this capacitive network each weight is determined by the difference in the capacitances of a respective pair of capacitive elements. The weighted summation to generate a final weighted summation result also is advantageously done in the analog regime, since this facilitates the analog final weighted summation result being non-linearly processed in an analog amplifier with sigmoidal response. This non-linear processing generates an analog axonal output response for a neural net layer, which analog axonal output response can then be digitized.

40 Claims, 12 Drawing Sheets

NON-LINEAR VOLTAGE FOLLOWER    BIAS NETWORK

ANALOG NEURAL NETS SUPPLIED DIGITAL SYNAPSE SIGNALS ON A BIT-SLICE BASIS

The invention relates to analog computer structures that emulate portions of a brain in operation, and more particularly, to adapting such analog computer structures for use with digital electronic circuits.

BACKGROUND OF THE INVENTION

Computers of the von Neumann type architecture have limited computational speed owing to the communication limitations of the single processor. These limitations can be overcome if a plurality of processors are utilized in the calculation and are operated at least partly in parallel. This alternative architecture, however, generally leads to difficulties associated with programming complexity. Therefore, it is often not a good solution. Recently, an entirely different alternative that does not require programming has shown promise. The networking ability of the neurons in the brain has served as a model for the formation of a highly interconnected set of analog processors, called a "neural network" or "neural net" that can provide computational and reasoning functions without the need of formal programming. The neural nets can learn the correct procedure by experience rather than being preprogrammed for performing the correct procedure. The reader is referred to R. P. Lippmann's article "An Introduction to Computing With Neural Nets" appearing on pages 4–21 of the April 1987 *IEEE ASSP MAGAZINE* (0740-7467/87/0400-0004/$10.00 1987 IEEE), incorporated herein by reference, for background concerning neural nets.

Neural nets are composed of a plurality of neuron models, analog processors each exhibiting "axon" output signal response to a plurality of "synapse" input signals. In a type of neural net called a "perceptron", each of these processors calculates the weighted sum of its "synapse" input signals, which are respectively weighted by respective weighting values that may be positive- or negative-valued, and responds non-linearly to the weighted sum to generate the "axon" output response. In the present-day development of the integrated electronic circuitry art, the weighted summation of a large number of terms, each of which has resolution that would require plural-bit digital sampling, can be done appreciably faster and at less cost in integrated circuit die area by processing in the analog regime rather than in the digital regime.

Using capacitors to perform weighted summation in accordance with Coulomb's Law provides neural nets of given size operating at given speed that consume less power than those the analog processors of which use resistors to implement weighted summation in accordance with Ohm's Law. Y. P. Tsividis and D. Anastassion in a letter "Switched-Capacitor Neural Networks" appearing in ELECTRONICS LETTERS, 27th August 1987, Vol. 23, No. 18, pages 958,959 (IEE) describe one method of implementing weighted summation in accordance with Coulomb's Law. Their method, a switched capacitor method, is useful in analog sampled-data neural net systems. Methods of implementing weighted summation in accordance with Coulomb's Law that do not rely on capacitances being switched and avoid the complexity of the capacitor switching elements and associated control lines are also known.

U.S. patent application Ser. No. 366,838 entitled "NEURAL NET USING CAPACITIVE STRUCTURES CONNECTING INPUT LINES AND DIFFERENTIALLY SENSED OUTPUT LINE PAIRS" describes a type of neural net in which each analog synapse input signal voltage drives a respective input line from a low source impedance. Each input line connects via a respective weighting capacitor to each of a plurality of output lines. The output lines are paired, with the capacitances of each pair of respective weighting capacitors connecting a pair of output lines to one of the input lines summing to a prescribed value. A respective pair of output lines is associated with each axonal output response to be supplied from the neural net, and the differential charge condition on each pair of output lines is sensed to generate a voltage that describes a weighted summation of the synapse input signals supplied to the neural net. A respective operational amplifier connected as a Miller integrator can be used for sensing the differential charge condition on each pair of output lines. Each weighted summation of the synapse input signals is then non-linearly processed in a circuit with sigmoidal transfer function to generate a respective axonal output response. This type of neural net is particularly well-suited for use where all input synapse signals are always of one polarity, since the single-polarity synapse input signals may range over the entire operating supply.

U.S. patent application Ser. No. 366,839 entitled "NEURAL NET USING CAPACITIVE STRUCTURES CONNECTING OUTPUT LINES AND DIFFERENTIALLY DRIVEN INPUT LINE PAIRS" describes a type of neural net in which each analog synapse input signal voltage is applied in push-pull from low source impedances to a respective pair of input lines. Each pair of input lines connect via respective ones of a respective pair of weighting capacitors to each of a plurality of output lines. The capacitances of each pair of respective weighting capacitors connecting a pair of input lines to one of the output lines sum to a prescribed value. Each output line is associated with a respective axonal output response to be supplied from the neural net, and the charge condition on each output line is sensed to generate a voltage that describes a weighted summation of the synapse input signals supplied to the neural net. A respective operational amplifier connected as a Miller integrator can be used for sensing the charge condition on each output line. Each weighted summation of the synapse input signals is then non-linearly processed in a circuit with sigmoidal transfer function to generate a respective axonal output response. This type of neural net is better suited for use where input synapse signals are sometimes positive in polarity and sometimes negative in polarity.

U.S. Pat. No. 5,039,871, issued 13 Aug. 1991 to by W. E. Engeler, entitled "CAPACITIVE STRUCTURES FOR WEIGHTED SUMMATION, AS USED IN NEURAL NETS" and assigned to General Electric Company describes preferred constructions of pairs of weighting capacitors for neural net layers, wherein each pair of weighting capacitors has a prescribed differential capacitance value and is formed by selecting each of a set of component capacitive elements to one or the other of the pair of weighting capacitors. U.S. Pat. No. 5,039,870, issued 13 Aug. 1991 to W. E. Engeler, entitled "WEIGHTED SUMMATION CIRCUITS HAVING DIFFERENT-WEIGHT RANKS OF CAPACITIVE STRUCTURES" and assigned to General Electric Company describes how weighting capacitors can be constructed on a bit-sliced or binary-digit-sliced basis. These weighting capacitor construction techniques are applicable to neural nets that utilize digital input signals, as will be presently described, as well as being applicable to neural nets that utilize analog input signals.

The neural nets as thusfar described normally utilize analog input signals that may be sampled-data in nature. A paper by J. J. Bloomer, P. A. Frank and w. E. Engeler entitled "A Preprogrammed Artificial Neural Network Architecture in Signal Processing" published in December 1989 by the GE Research & Development Center describes the application of push-pull ternary samples as synapse input signals to neural network layers, which push-pull ternary samples can be generated responsive to single-bit digital samples.

Analog input signal samples are supplied to a neural net layer parallely in time. There is a class of problems that can usefully employ neural nets for their solution, but for which input signal samples are not available parallely in time. The paper "A Preprogrammed Artificial Neural Network Architecture in Signal Processing" describes the application of serially received analog samples to a plural-stage analog delay line to provide at the outputs of the stages the analog input signal samples supplied to a neural net layer parallely in time. The paper also describes the application of serially received digital samples to a serial-in/parallel out (SIPO) shift register, the outputs of the shift register stages determining the push-pull ternary samples applied in parallel as synapse input signals to neural network layers.

There is a class of problems that can usefully employ neural nets for their solution, but for which synapse input signal samples are plural-bit digital samples. Particularly where there are numerous plural-bit digital synapse input signal samples, difficulties are encountered in getting the plural-bit digital samples into the monolithic integrated circuit in which a neural net layer reposes, because of practical limitations on the number of pins available on the integrated circuit package. An example of when this type of problem is encountered is when one attempts to use a neural net to perform the two-dimensional spatial filtering associated with the recognition of shapes in video signals generated by raster scanning a focal plane array of photosensors in a video camera. In such two-dimensional spatial filtering it is desirable to provide for the temporary storage of the raster-scanned video signal samples, so that they may be temporally aligned for application to the neural net. In the present state of technology the temporary storage of a substantial number of video samples is most advantageously done in digital memory. The synapse input signals made available to the neural net from the digital memory are in digital, not analog, form.

The problem of the synapse input signals made available to a neural net being in plural-bit digital form rather than in analog form can arise in other contexts, too. In systems where the neural net layers are not located in proximity to each other the axon output response of a hidden neural net layer can be digitized in an analog-to-digital converter and transferred without error over substantial distances to another neural net layer. Using digital rather than analog signals to communicate between neural net layers can also be useful when back-propagation training algorithms are used to train a neural net, since it easier in the digital regime to alter the training algorithm in specified ways to take into account whether a new task is being learned or whether instead an old task is being modified to take into account a change in the operating environment.

Streams of digital samples have to be converted to respective analog input signals in order to be used with the neural nets known in the prior art; and, since the samples requiring conversion are parallel in time, a respective digital-to-analog converter is required for each input signal to the neural net. Except where the streams of digital samples are single-bit in nature, the well-known problems of avoiding the conversion non-linearity associated with converting a multiple-bit digital number code stream to a respective analog signal have to be faced with regard to each of these digital-to-analog converters, and these problems are known to be more difficult to solve as the size of the converters has to be made smaller to accommodate a large number of them on a monolithic integrated circuit.

SUMMARY OF THE INVENTION

Plural-bit digital input signals to be subjected to weighted summation in a neural net layer are bit-sliced into a plurality B in number of bit slices; and a number N of respective first through $N^{th}$ weighted summations of the bits of the digital input signals in each bit slice are performed, resulting in a respective set of first through $N^{th}$ partial weighted summation results. Weighted summations of the partial weighted summation results of similar ordinal number are then performed to generate first through $N^{th}$ final weighted summation results. Each weighted summation of a bit slice of the digital input signals is performed using a capacitive network that generates partial weighted summation results in the analog regime. This capacitive network that generates partial weighted summation results can be one of the types taught for use with analog input signals in the inventor's previous patent applications Ser. No. 366,838 and Ser. No. 366,839. The weighted summation to generate a final weighted summation result also is advantageously done in the analog regime, since this facilitates the analog final weighted summation result being non-linearly processed in an analog amplifier with sigmoidal response. This non-linear processing generates an analog axonal output response for a neural net layer, which analog axonal output response can then be digitized.

DETAILED DESCRIPTION

Figure 1:
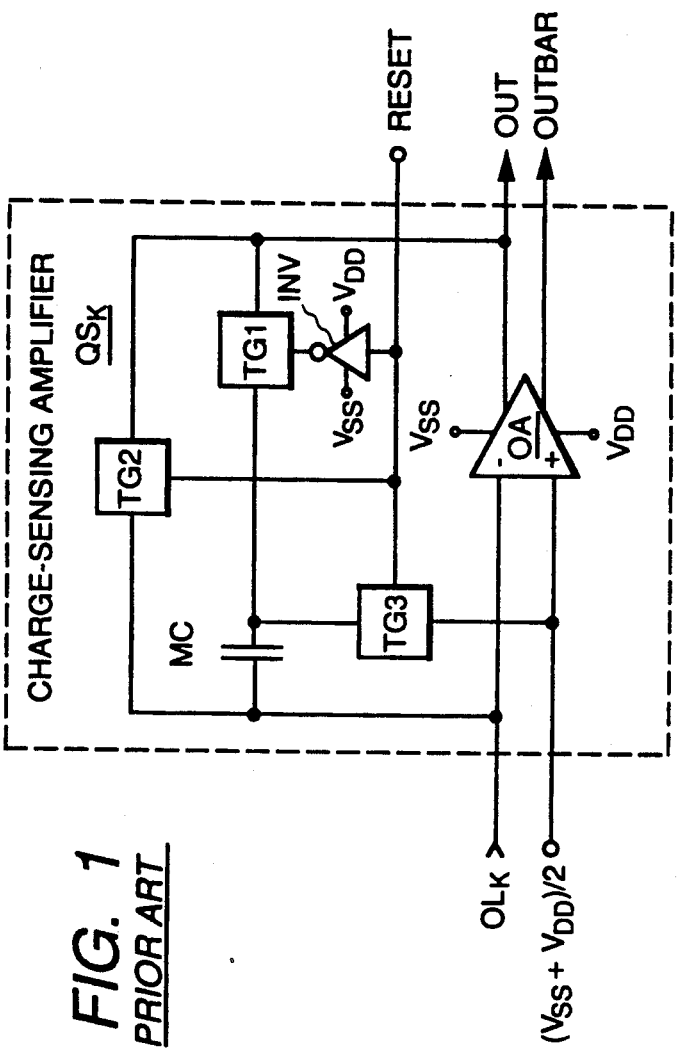
FIG. 1 is a schematic diagram of a prior-art single-ended charge sensing amplifier comprising a Miller integrator with resetting circuitry that compensates for input offset error in the differential-input operational amplifier the Miller feedback capacitor provides degenerative feedback to; this type of single-ended charge sensing amplifier and a balanced version thereof are preferred over simpler Miller integrators for the charge sensing amplifiers used in the neural nets of the invention.
Figure 8:
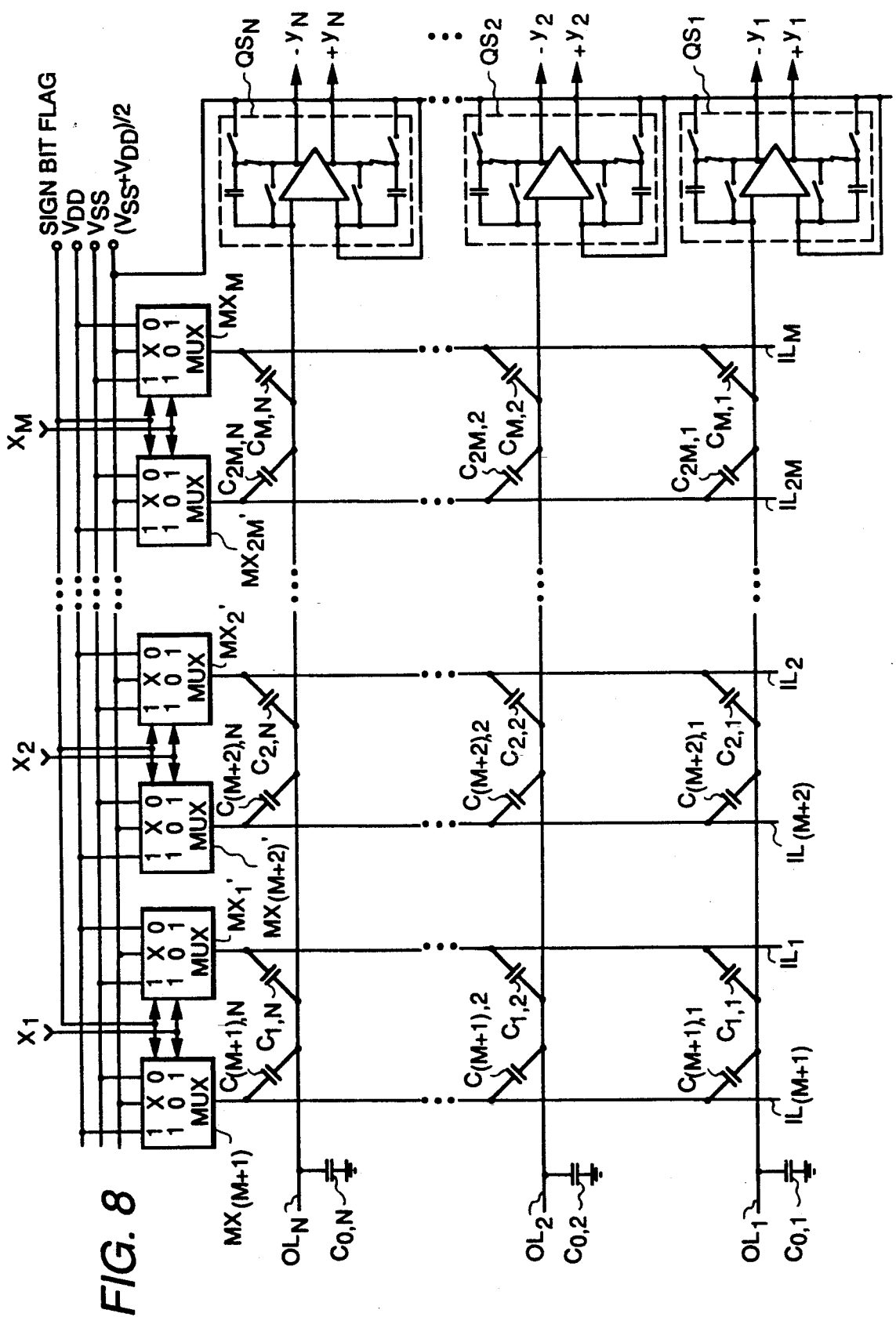
FIGS. 8 and 9 are schematic diagrams of two further apparatuses, each for performing a plurality of weighted summation procedures in parallel on a bit slice of input signals, and each embodying aspects of the invention.
Figure 10:
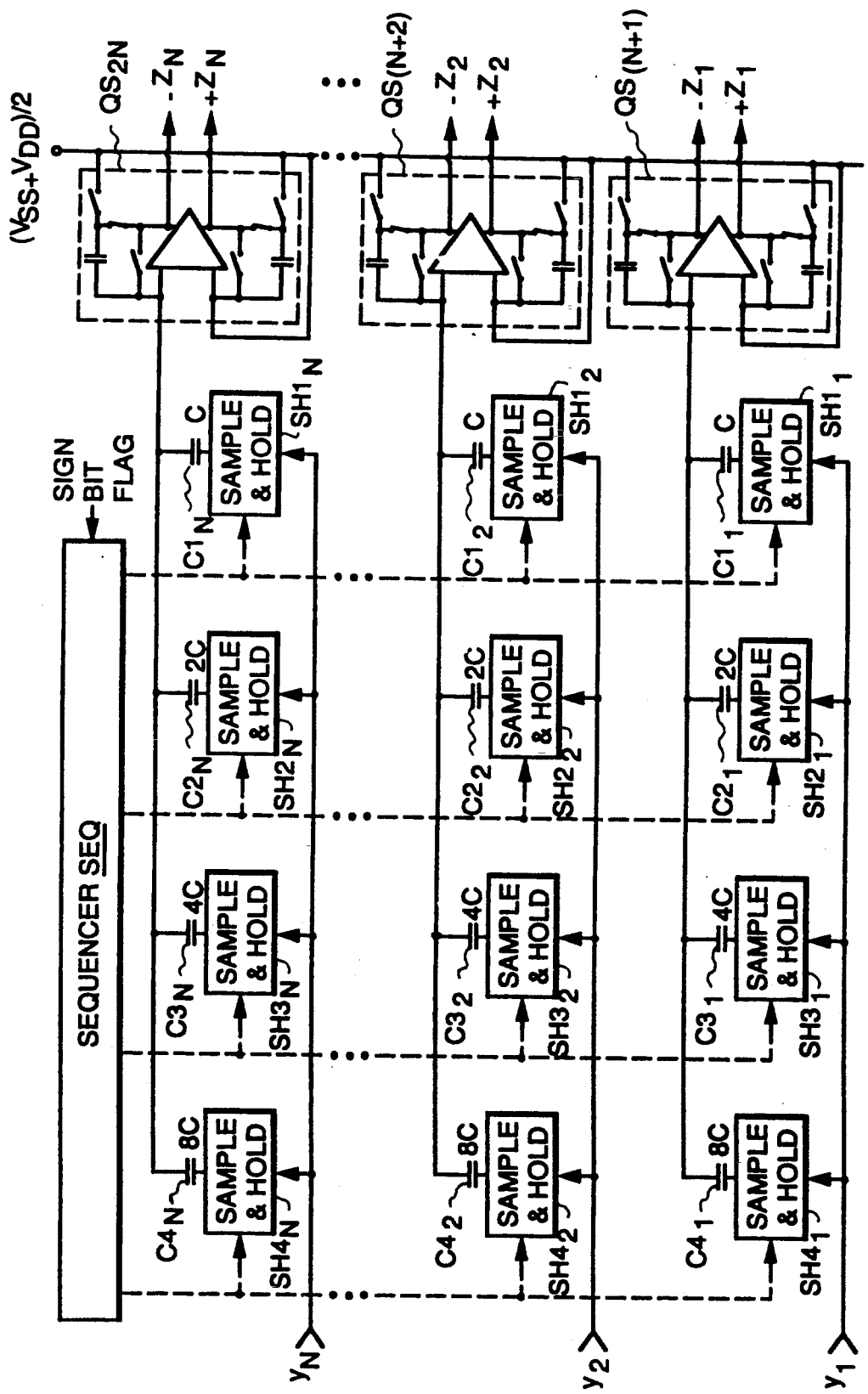
FIG. 10 is a schematic diagram of apparatus for performing a plurality of weighted summation procedures, each of which weighted summation procedures weights and sums sequentially supplied data in accordance with an aspect of the invention.

FIG. 1 shows a single-ended charge sensing amplifier $QS_k$ of a preferable type for implementing the single-ended charge sensing amplifiers used in modifications of the FIG. 8 and 10 circuitry. The charge sensing amplifier $QS_k$ is essentially a Miller integrator that includes a differential-input operational amplifier OA having a Miller feedback capacitor MC connecting from its output connection OUT back to its inverting (−) input connection during normal operation. The non-inverting (+) input connection of the operational amplifier OA is connected to a fixed potential in the single-ended charge sensing amplifier $QS_k$, which fixed potential is shown as having a value $(V_{SS}+V_{DD})/2$ midway between a relatively high potential ($V_{DD}$) and a relatively low potential ($V_{SS}$). During normal charge-sensing operation a relatively low potential ($V_{SS}$) is applied via RESET terminal to a logic inverter INV that responds to apply a relatively high potential ($V_{DD}$) to a transmission gate TG1. The transmission gate TG1 is rendered conductive to connect the output connection OUT of operational amplifier OA to capacitor MC to complete its connection as Miller feedback capacitor. The relatively low potential applied via RESET terminal conditions a transmission gate TG2 and a transmission gate TG3 both to be non-conductive. $QS_k$ is a preferred charge sensing amplifier because differential input offset error in the operational amplifier OA is compensated against, owing to the way the Miller integrator is reset.

During periodic reset intervals for the integrator a relatively high potential ($V_{DD}$) is applied via RESET terminal to condition transmission gates TG2 and TG3 each to be conductive and to condition the logic inverter INV output potential to go low, which renders transmission gate TG1 non-conductive. The conduction of transmission gate TG2 connects the output connection OUT of operational amplifier OA directly to its inverting (−) input connection, completing a feedback connection that forces the inverting (−) input connection to the differential input offset error voltage, which voltage by reason of transmission gate TG3 being conductive is stored on the Miller capacitor MC. When normal charge-sensing operation is restored by RESET terminal going low, the differential input offset error bias remains stored on the Miller capacitor MC, compensating against its effect upon charge sensing.

Supposing the operational amplifier OA to be a differential output type having balanced output connections OUT and OUTBAR, a balanced version of the charge sensing amplifier $QS_k$ can be formed by disconnecting the non-inverting (+) input connection of the operational amplifier OA from a point of fixed potential having a value $(V_{SS}+V_{DD})/2$. Instead, the non-inverting (+) input connection of the operational amplifier OA is arranged to have a feedback connection from the OUTBAR output connection of the operational amplifier OA similar to the feedback connection from the OUT output connection of the operational amplifier OA to its inverting (−) input connection. This balanced version of the charge sensing amplifier $QS_k$ is shown in FIGS. 2–5 and 8–10.

M is a positive plural integer indicating the number of input signals to the FIG. 2, 3, 4, 8 or 9 weighted summation apparatus, and N is a positive plural integer indicating the number of output signals the FIG. 2, 3, 4, 8 or 9 apparatus can generate. To reduce the written material required to describe operation of the weighted summation apparatuses in FIGS. 2, 3, 4, 8 and 9 of the drawing, operations using replicated elements will be described in general terms; using a subscript i ranging over all values one through M for describing operations and circuit elements as they relate to the (column) input signals $x_1, x_2, \ldots x_M$; and using a subscript j ranging over all values one through N for describing operations and apparatus as they relate to the (row) output signals $y_1, y_2, \ldots y_N$. That is, i and j are the column and row numbers used to describe particular portions of the FIGS. 2, 3, 4, 8 and 9 weighted summation apparatuses and modifications of those apparatuses.

Figure 2:
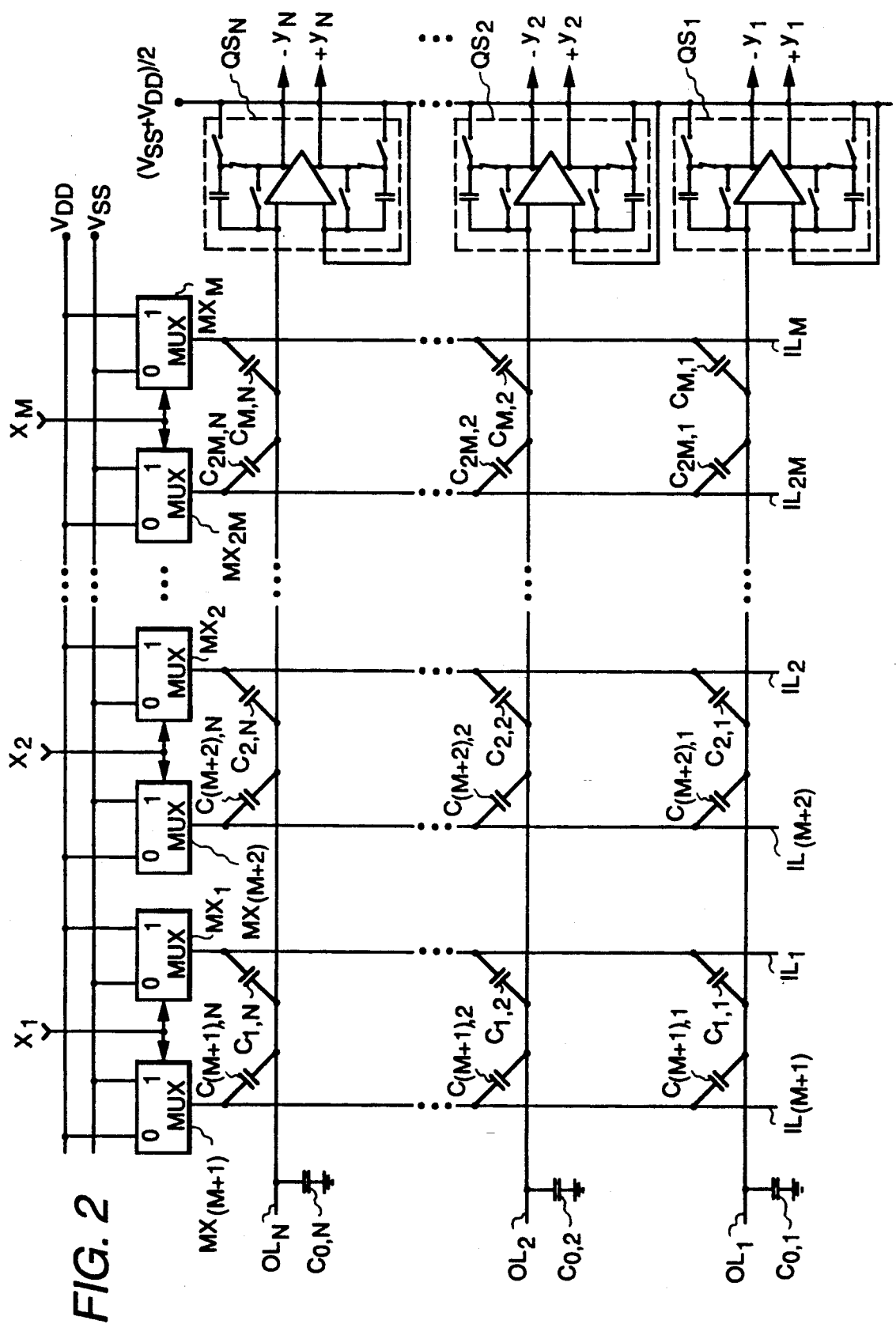
FIGS. 2, 3 and 4 are schematic diagrams of three different apparatuses, each for performing a plurality of weighted summation procedures in parallel on a bit slice of input signals, and each, embodying aspects of the invention.

The FIG. 2 apparatus performs a plurality of weighted summation procedures in parallel on each successive bit slice of input signals, which input signals comprise a plurality M in number of parallel bit streams $x_1, x_2, \ldots x_M$. This apparatus is assumed to receive a first operating voltage $V_{DD}$, a second operating voltage $V_{SS}$, and a third operating voltage $(V_{SS}+V_{DD})/2$ midway between $V_{SS}$ and $V_{DD}$. $V_{DD}$ and $V_{SS}$ are presumed to be relatively positive and relatively negative respective to each other.

Each input voltage signal $x_i$ is applied as control signal to a respective multiplexer $MX_i$ and to a respective multiplexer $MX_{(i+M)}$. Multiplexer $MX_i$ responds to $x_i$ being a ONE to apply the $V_{DD}$ first operating voltage to an input line $IL_i$ and responds to $x_i$ being a ZERO to apply the $V_{SS}$ second operating voltage to the input line $IL_i$. Multiplexer $MX_{(i+M)}$ responds to $x_i$ being a ONE to apply the $V_{SS}$ second operating voltage to an input line $IL_{(i+M)}$ and responds to $x_i$ being a ZERO to apply the $V_{DD}$ first operating voltage to the input line $IL_{(i+M)}$.

A capacitor $C_{i,j}$ has a first plate connected to the input line $IL_i$ and has a second plate connected to an output line $OL_j$. A capacitor $C_{(i+M),j}$ has a first plate connected to the input line $IL_{(i+M)}$ and has a second plate connected to the output line $OL_j$. Capacitor $C_{i,j}$ and capacitor $C_{(i+M),j}$ together are considered as a pair, for providing in effect a single weighting capacitor, the capacitance of which is the difference in the capacitances of capacitor $C_{i,j}$ and capacitor $C_{(i+M),j}$ between their respective first and second plates. The charge placed on the output line $OL_j$ by all the weighting capacitors connecting thereto is sensed on a single-ended basis by a respective charge-sensing amplifier $QS_j$. Each of the charge-sensing amplifiers $QS_j$ is shown as a respective Miller integrator comprising an operational amplifier and Miller feedback capacitors.

During reset or zeroing of all the charge-sensing amplifiers $QS_j$, each of the $x_i$ input voltages is a logic ZERO. This applies $V_{SS}$ to the plates of capacitors $C_{i,j}$ connected from the multiplexers $MX_i$ and applies $V_{DD}$ to the plates of capacitors $C_{(i+M),j}$ connected from the multiplexers $MX_{(i+M)}$. The total capacitance on each output line $OL_j$ is caused to be the same as on each of the other output lines by a respective shunt capacitor $C_{o,j}$ to signal ground, which capacitor either has capacitance that is so large as to overwhelm the other capacitances on the output line $OL_j$ or preferably that complements the other capacitances on the output line $OL_j$. Causing the total capacitance on each output line $OL_j$ to be the same as on each of the other output lines makes the sensitivities of the charge-sensing amplifiers $QS_j$ to their respective inputs uniform, presuming them to be Miller integrators of identical design. If the capacitances of capacitor $C_{i,j}$ and capacitor $C_{(i+M),j}$ between their respective first and second plates sum to a prescribed standard value, for the complete selection range of i and j, the sensitivities of the charge-sensing amplifiers $QS_j$ to their respective inputs are uniform without need for a respective shunt capacitor $C_{o,j}$ to signal ground for each output line $OL_j$, presuming the charge-sensing amplifiers $QS_j$ to be Miller integrators of identical design.

After reset or zeroing, when $x_i$ bits for different i may each be ZERO or ONE, each $x_i$ bit that is a ZERO creates no change in charge condition on any of the output lines $OL_j$. A bit $x_i$ that is a ONE creates an incremental change in charge on an output line $OL_j$ that, in accordance with Coulomb's Law, is equal to $(V_{SS}-V_{DD})/2$ times the difference in the capacitances of capacitors $C_{i,j}$ and $C_{(i+M),j}$ between their respective first and second plates. The sum of these incremental charges accumulates on the output line $OL_j$ and is sensed by the charge-sensing amplifier $QS_j$.

Figure 3:
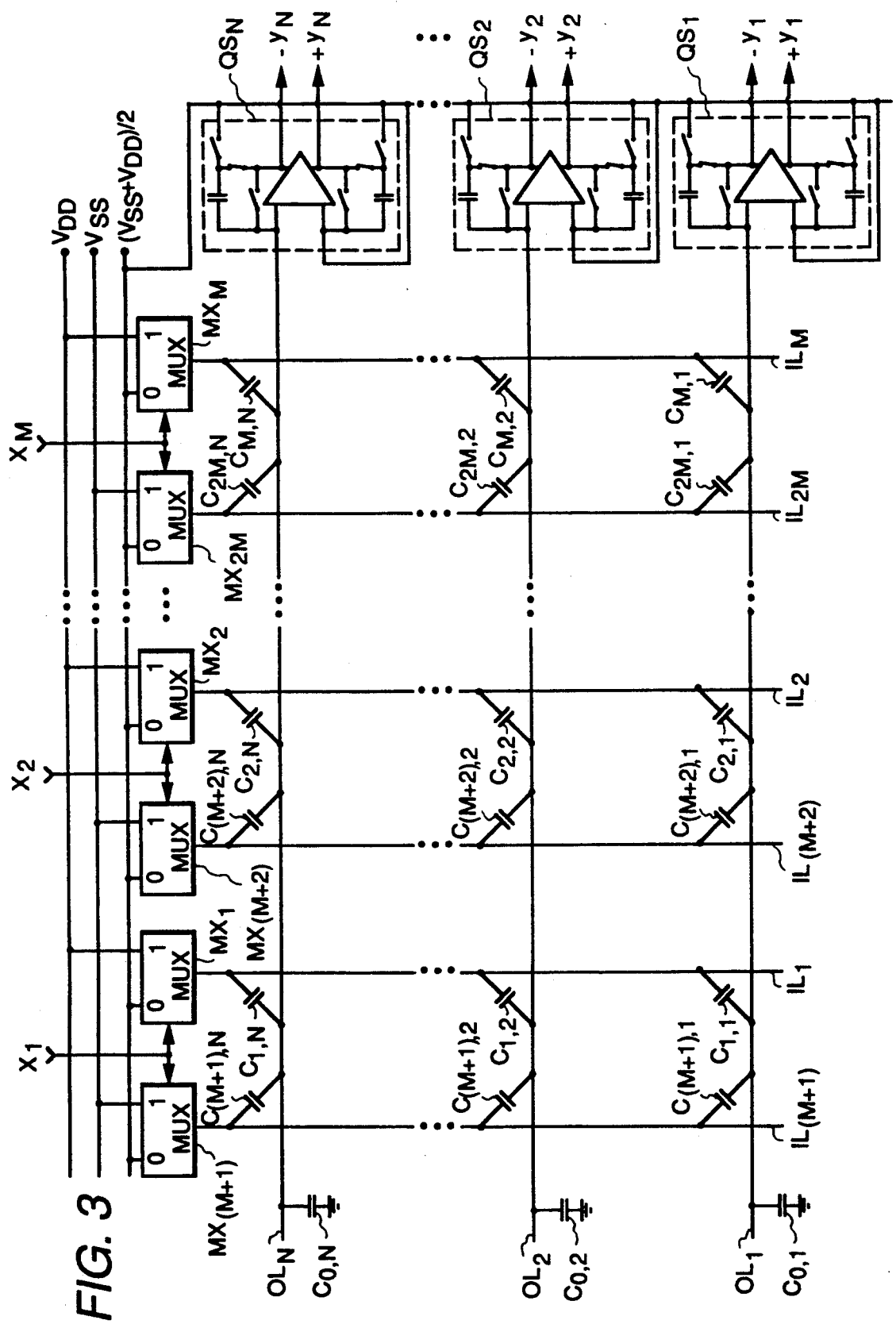

FIG. 3 shows a modification of the FIG. 2 apparatus in which the multiplexer $MX_i$ and the multiplexer $MX_{(i+M)}$ respond to $x_i$ being a ZERO to apply the third operating voltage $(V_{SS}+V_{DD})/2$ to the input line $IL_i$ and to the input line $IL_{(i+M)}$, respectively. During reset, the weighting capacitors $C_{i,j}$ and $C_{(i+M)}$ will be charged to relatively small bias voltages between their plates, rather than to bias voltages of amplitudes close to $(V_{SS}+V_{DD})/2$. The FIG. 2 apparatus is advantageous over the FIG. 3 apparatus in that, in the FIG. 2 apparatus, accuracy of the third operating voltage $(V_{SS}+V_{DD})/2$ being exactly midway between the first operating voltage $V_{DD}$ and the second operating voltage $V_{SS}$ is not necessary for accuracy of the partial weighted summation results.

Figure 4:
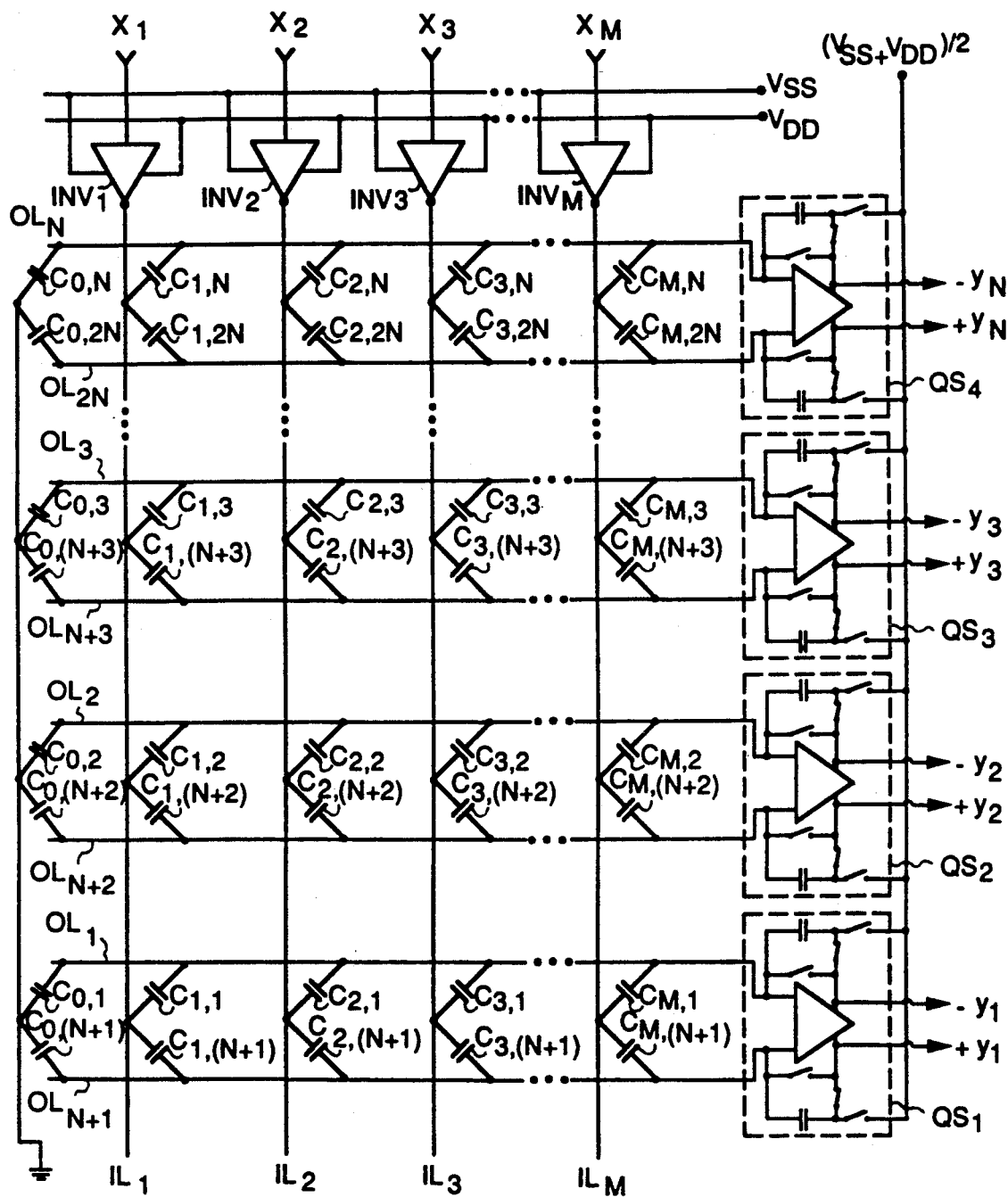

The FIG. 4 apparatus also performs a plurality of weighted summation procedures in parallel on each successive bit slice of input signals, which input signals comprise a plurality M in number of parallel bit streams $x_1, x_2, x_3, \ldots x_M$. Logic inverters $INV_1, INV_2, INV_3, \ldots INV_M$ respond to the current bits $x_1, x_2, x_3, \ldots x_M$ respectively with their respective logic complements. (The current bits $x_1, x_2, x_3, \ldots x_M$ are assumed to be supplied in accordance with the positive logic convention.) The FIG. 4 apparatus also is assumed to receive a relatively positive first operating voltage $V_{DD}$, a relatively negative second operating voltage $V_{SS}$, and a third operating voltage $(V_{SS}+V_{DD})/2$ midway between $V_{SS}$ and $V_{DD}$.

The logic inverter $INV_i$ responds to $x_1$ being a ZERO to apply $V_{DD}$ to an input line $IL_i$ and responds to $x_1$ being a ONE to apply $V_{SS}$ to the input line $IL_i$. As in FIGS. 2 and 3, the charge-sensing amplifier $QS_j$ is one of a plurality, N in number, of identical charge-sensing amplifiers for sensing the difference in charges accumulated on a respective pair of output lines. In FIG. 4 the charge-sensing amplifier $QS_j$ is arranged for differentially sensing charge and is connected to sense the difference in charges accumulated on output lines $OL_j$ and $OL_{(j+N)}$. The output lines $OL_j$ and $OL_{(j+N)}$ are charged from each input line input line $IL_i$ via a capacitor $C_{i,j}$ and via a capacitor $C_{i,(j+N)}$, respectively. Capacitor $C_{i,j}$ and capacitor $C_{i,(j+N)}$ together are considered as a pair, for providing in effect a single weighting capacitor, the capacitance of which is the difference in the capacitances of capacitor $C_{i,j}$ and capacitor $C_{i,(j+N)}$ between their respective first and second plates. The total capacitance on each output line $OL_j$ is maintained the same as on each of the other output lines by a respective shunt capacitor $C_{o,j}$ to signal ground; and the total capacitance on each output line $OL_{(j+N)}$ is maintained the same as on each of the other output lines by a respective shunt capacitor $C_{o,(j+N)}$ to signal ground.

Where the capacitances of capacitor $C_{i,j}$ and capacitor $C_{i,(j+N)}$ between their respective first and second plates are to be alterable responsive to digital programming signals, it is preferred that the capacitances of capacitor $C_{i,j}$ and capacitor $C_{i,(j+N)}$ between their respective first and second plates sum to a prescribed standard value for the complete selection range of i and j. It is further preferred that each pair of capacitors $C_{i,j}$ and $C_{i,(j+N)}$ have a corresponding further pair of capacitors $C_{i,(j+2N)}$ and $C_{i,(j+3N)}$ associated therewith, capacitor $C_{i,(j+2N)}$ having a capacitance equal to that of capacitor $C_{i,(j+N)}$ and connecting output line $OL_j$ to a point of connection $P_{i,j}$, and capacitor $C_{i,(j+3N)}$ having a capacitance equal to that of capacitor $C_{i,j}$ and connecting output line $OL_{(j+N)}$ to the same point of connection $P_{i,j}$. If all the points of connection $P_{i,j}$ connect to signal ground, the capacitors $C_{i,(j+2N)}$ for all values of i together provide for each value of j the respective shunt capacitor $C_{o,j}$ to signal ground, and the capacitors $C_{i,(j+3N)}$ for all values of i together provide for each value of j the respective shunt capacitor $C_{o,(j+N)}$ to signal ground. This is taught in greater detail in U.S. Pat. No. 5,039,871, issued 13 Aug. 1991.

The FIG. 4 apparatus may be modified to replace logic inverters $INV_1, INV_2, INV_3, \ldots INV_M$ with non-inverting driver amplifiers. In such case the other output connections of the differential-output operational amplifiers in the charge sensing amplifiers $QS_1, QS_2, QS_3, \ldots QS_N$ are used to supply the $y_1, y_2, y_3, \ldots y_N$ partial weighted summations.

Figure 6:
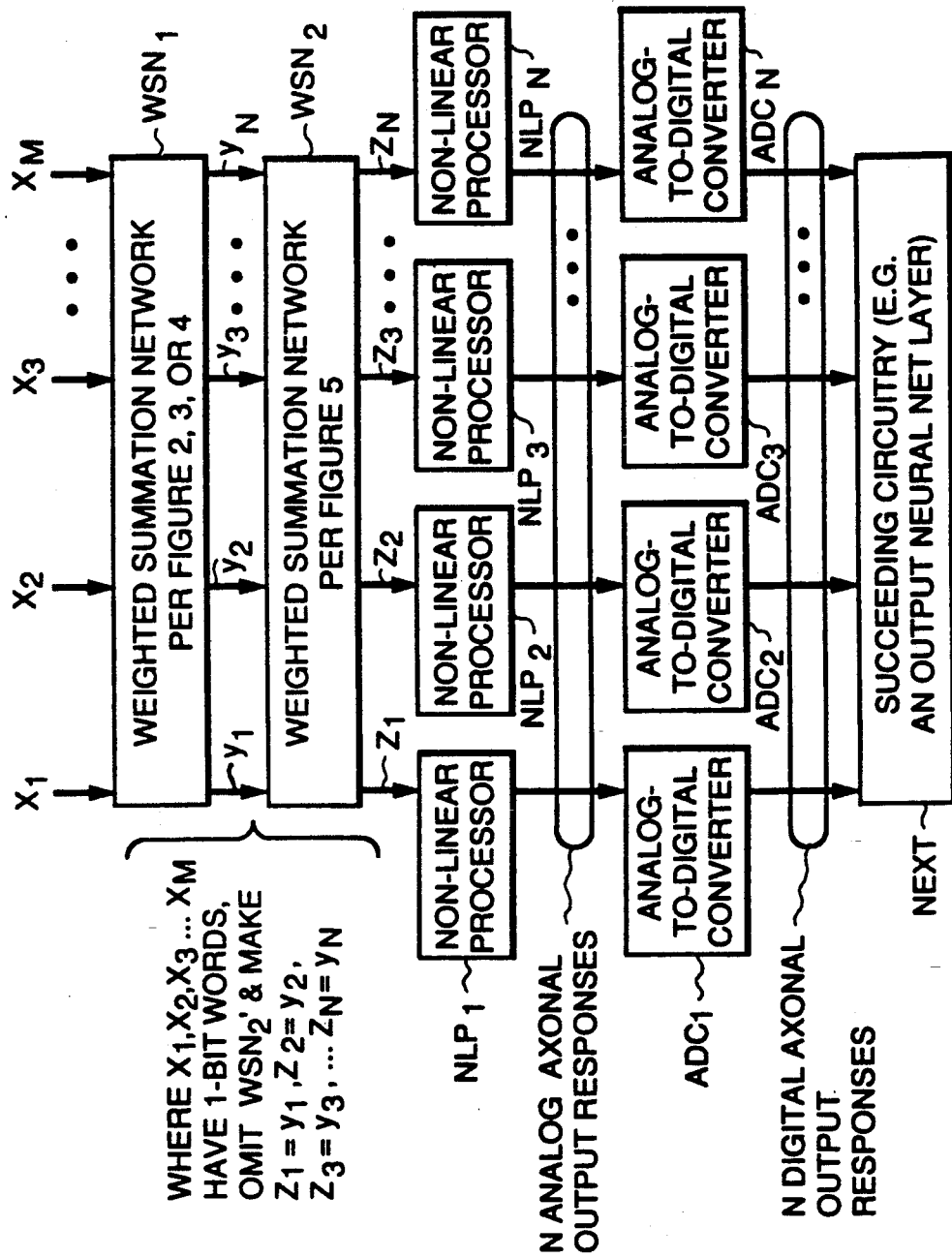
FIG. 6 is a schematic diagram of a neural net layer including any of the FIG. 2, FIG. 3 and FIG. 4 apparatuses for performing a plurality of weighted summation procedures; possibly a FIG. 5 apparatus for performing a plurality of weighted summation procedures; an array of non-linear processors and an array of analog-to-digital converters, each of which alternative neural net layers embodies the invention in a respective one of its aspects.

The FIG. 4 apparatus may alternatively be modified to augment logic inverters $INV_1$, $INV_2$, $INV_3$, ... $INV_M$ with non-inverting driver amplifiers $DA_1$, $DA_2$, $DA_3$, ... $DA_M$ respectively and to use each non-inverting driver amplifier $DA_i$ to drive the points of connection $P_{i,j}$ for all values of j. This provides for full-capacitor bridge drives to each charge-sensing amplifier $QS_j$, rather than half-capacitor bridge drives. The advantage of doing this is that the common-mode voltage on the output lines $OL_j$ and $OL_{(j+N)}$ is zero, so one does not have to rely as much on the common-mode suppression of the charge-sensing amplifier $QS_j$ to keep the integration of charge within the operating supply range of that amplifier.

Where the input signals to the FIG. 2, FIG. 3 or FIG. 4 weighted summation apparatus comprise single-bit words, the N signals $y_1$, $y_2$, $y_3$, ... $y_N$ can, per FIG. 6, be applied to an array of respective non-linear processors $NLP_1$, $NLP_2$, $NLP_3$, ... $NLP_N$ to generate a plurality, N in number, of analog axonal output responses. As shown in FIG. 6, these analog axonal output responses can be digitized in respective analog-to-digital converters $ADC_1$, $ADC_2$, $ADC_3$, ... $ADC_N$, for application to the succeeding circuitry NEXT. For example, this succeeding circuitry may be an output neural net layer where the neural net layer thusfar described is a hidden neural net layer. Oversampling analog-to-digital converters of the sigma-delta type are preferred for analog-to-digital converters $ADC_1$, $ADC_2$, $ADC_3$, ... $ADC_N$ when passing digitized axonal output responses to another weighted summation apparatus of one of the types illustrated in FIGS. 2-4, since the sigma-delta type of converter is inherently adapted to supplying its digitized response in bit-serial form.

Figure 5:
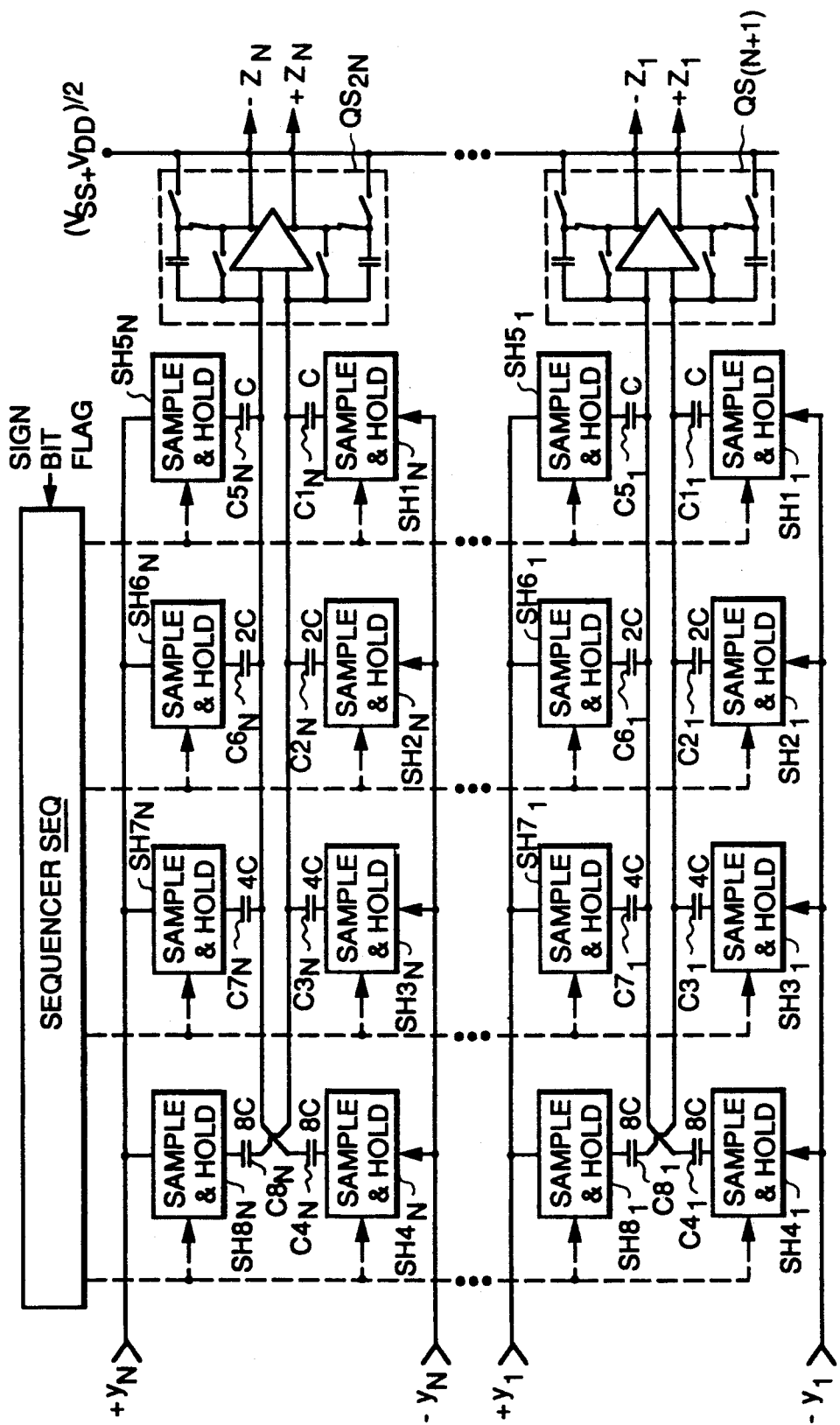
FIG. 5 is a schematic diagram of apparatus for performing a plurality of weighted summation procedures, each of which weighted summation procedures weights and sums sequentially supplied data in accordance with an aspect of the invention.

FIG. 5 shows further weighted summation apparatus that can be used with the weighted summation apparatus of FIG. 2, 3 or 4 to provide for the weighted summation of digital signals having plural-bit words. The plurality B in number of bits per digital word is assumed in FIG. 5 to be four bits per digital word. The digital signals are placed in bit-serial form and in word alignment for application to the weighted summation apparatus of FIG. 2, 3 or 4, which processes the bit-serial digital signals on a bit-slice basis to generate B partial weighted summation results, one per bit slice, during each successive word interval. A SIGN BIT FLAG signal is provided to signal the parallel occurrence of the sign bits in each successive group of M input signal words. The SIGN BIT FLAG signal is used to synchronize the operation of a sequencer SEQ in the further weighted summation apparatus of FIG. 5. (Where the synapse input signals $x_1$, $x_2$, ... $x_M$ are unsigned, the SIGN BIT FLAG signal is replaced by a MOST SIGNIFICANT BIT FLAG Signal, of course.)

The FIG. 5 apparatus includes a plurality, N in number, of weighted summers generating respective ones of N final weighted summation results $z_1$, $z_2$, ... $z_N$. Each of these weighted summers weights the four partial weighted summation results $y_j$ sequentially supplied during a word interval as part of one of the output signals of the weighted summation apparatus of FIG. 2 or 3, the weighting being done in accordance with the significance of the bits used to generate each respective partial weighted summation result, and sums the weighted partial weighted summation results to generate a final weighted summation result $z_j$.

More particularly, when the sequencer SEQ determines that the least significant of the four partial weighted summation results $y_j$ associated with a digital word interval is being generated by the weighted summation apparatus of FIG. 2, 3 or 4, the sequencer SEQ directs sample-and-hold circuits $SH1_j$ and $SH5_j$ to sample and hold that $y_j$ value. When the sequencer SEQ determines that the next to least significant of the four partial weighted summation results $y_j$ associated with a digital word interval is being generated by the weighted summation apparatus of FIG. 2, 3 or 4, the sequencer SEQ directs sample and-hold circuits $SH2_j$ and $SH6_j$ to sample and hold that $y_j$ value. When the sequencer SEQ determines that the next to most significant of the four partial weighted summation results $y_j$ associated with a digital word interval is being generated by the weighted summation apparatus of FIG. 2, 3 or 4, the sequencer SEQ directs sample-and-hold circuits $SH3_j$ and $SH7_j$ to sample and hold that $y_j$ value. When the sequencer SEQ determines that the most significant of the four partial weighted summation results $y_j$ associated with a digital word interval is being generated by the weighted summation apparatus of FIG. 2, or 4 the sequencer SEQ directs a sample-and-hold circuit $SH4_j$ and $SH8_j$ to sample and hold that $y_j$ value. The sequencer SEQ may be designed to accommodate the particular bit-serial format being used. The common bit-serial formats arrange the bits in order of their significance, one such format beginning each digital word with its least significant bit and ending each digital word with its most significant (sign) bit, and another such format beginning each digital word with its most significant (sign) bit and ending each digital word with its least significant bit.

At the end of the word interval, the four partial weighted summation results $y_j$ are held in parallel at the output ports of the sample-and-hold circuits $SH1_j$, $SH2_j$, $SH3_j$ and $SH4_j$ and the four complementary partial weighted summation results $-y_j$ are held in parallel at the output ports of the sample-and-hold circuits $SH5_j$, $SH6_j$, $SH7_j$ and $SH8_j$. Weighting capacitors $C1_j$, $C2_j$, $C3_j$ and $C4_j$ are used to weight the four partial weighted summation results held by the sample-and-hold circuits $SH1_j$, $SH2_j$, $SH3_j$ and $SH4_j$, respectively. The four partial weighted summation results held by the sample-and-hold circuits $SH1_j$, $SH2_j$, $SH3_j$ and $SH4_j$ are weighted in 1:2:4:8 ratio by weighting capacitors $C1_j$, $C2_j$, $C3_j$ and $C4_j$, in accordance with the amplitudes of the weights +1, +2, +4 and −8 of the respective groups 0f bits generating them. (The most significant group of bits are assumed to be sign bits of two's complement numbers, which is the reason for the negative sign of the weighting by eight.) Similarly, the four partial weighted summation results held by the sample-and-hold circuits $SH5_j$, $SH6_j$, $SH7_j$ and $SH8_j$ are weighted in 1;2:4:8 ratio by weighting capacitors $C5_j$, $C6_j$, $C7_j$ and $C8_j$, in accordance with the amplitudes of the weights +1, +2, +4 and −8 of the respective groups of bits generating them. Accordingly, weighting capacitors $C1_j$, $C2_j$, $C3_j$, $C4_j$, $C5_j$, $C6_j$, $C7_j$, and $C8_j$ have respective capacitances in 1:2:4:8:1:2:4:8 ratio. The four partial weighted summation results held by the sample-and-hold circuits $SH1_j$, $SH2_j$, $SH3_j$ and $SH4_j$ charge the weighting capacitors $C1_j$, $C2_j$, $C3_j$ and $C4_j$ in respective amounts depending on their voltages and the capacitances of the capacitors to which they are applied, in accordance with Coulomb's Law. The four partial weighted summation results held by the sample-and-hold circuits $SH5_j$, $SH6_j$, $SH7_j$ and $SH8_j$ charge the weighting capacitors $C5_j$, $C6_j$, $C7_j$ and $C8_j$ in respective amounts depending on their voltages and the capacitances of the capacitors to which they are applied, in accordance with Coulomb's Law.

A charge sensing amplifier $QS_{(N+j)}$ then differentially senses the charge on the plates of the weighting capacitors $C5_j$, $C6_j$, $C7_j$ and $C4_j$ connecting to its inverting ($-$) input connection and the combined charge on the plates of the weighting capacitors $C1_j$, $C2_j$, $C3_j$ and $C8_j$ connecting to its non-inverting ($+$) input connection, to generate a final weighted summation result as a sample of its output signal $z_j$. Connecting plates of the weighting capacitors $C4_j$ and $C8_j$ to the inverting ($-$) input connection of the charge sensing amplifier $QS_{(N+j)}$ and to its non-inverting ($+$) input connection, respectively, provides for the negativeness associated with the minus eight weight of the sign bit in the two's complement numbering system.

Reset or zeroing of the charge sensing amplifiers $QS_{(N+j)}$ in FIG. 5 takes place at the same time as the reset or zeroing of the charge sensing amplifiers $QS_j$ in the preceding FIG. 2, 3 or 4 weighted summation circuitry. During reset the $(V_{SS}+V_{DD})/2$ third operating voltage at the $y_j$ and $-y_j$ output connections of the charge sensing amplifiers $QS_j$ are applied to the plates of the weighting capacitors $C1_j$, $C2_j$, $C3_j$, $C4_j$, $C5_j$, $C6_j$, $C7_j$, and $C8_j$ by the sample-and-hold circuits $SH1_j$, $SH2_j$, $SH3_j$, $SH4_j$, $SH5_j$, $SH6_j$, $SH7_j$ and $SH8_j$.

Where the input signals to the FIG. 2, FIG. 3 or FIG. 4 weighted summation apparatus comprise plural-bit words, the N signals $z_1$, $z_2$, ... $z_N$ from a succeeding FIG. 5 weighted summation apparatus can then, per FIG. 6, be applied to an array of respective non-linear processors $NLP_1$, $NLP_2$, ... $NLP_N$ to generate a plurality, N in number, of analog axonal output responses. As shown in FIG. 6, these analog axonal output responses can be digitized in respective analog-to-digital converters $ADC_1$, $ADC_2$, $ADC_3$, ... $ADC_N$, for application to the succeeding circuitry NEXT. For example, this succeeding circuitry may be an output neural net layer where the neural net layer thusfar described is a hidden neural net layer.

Figure 7:
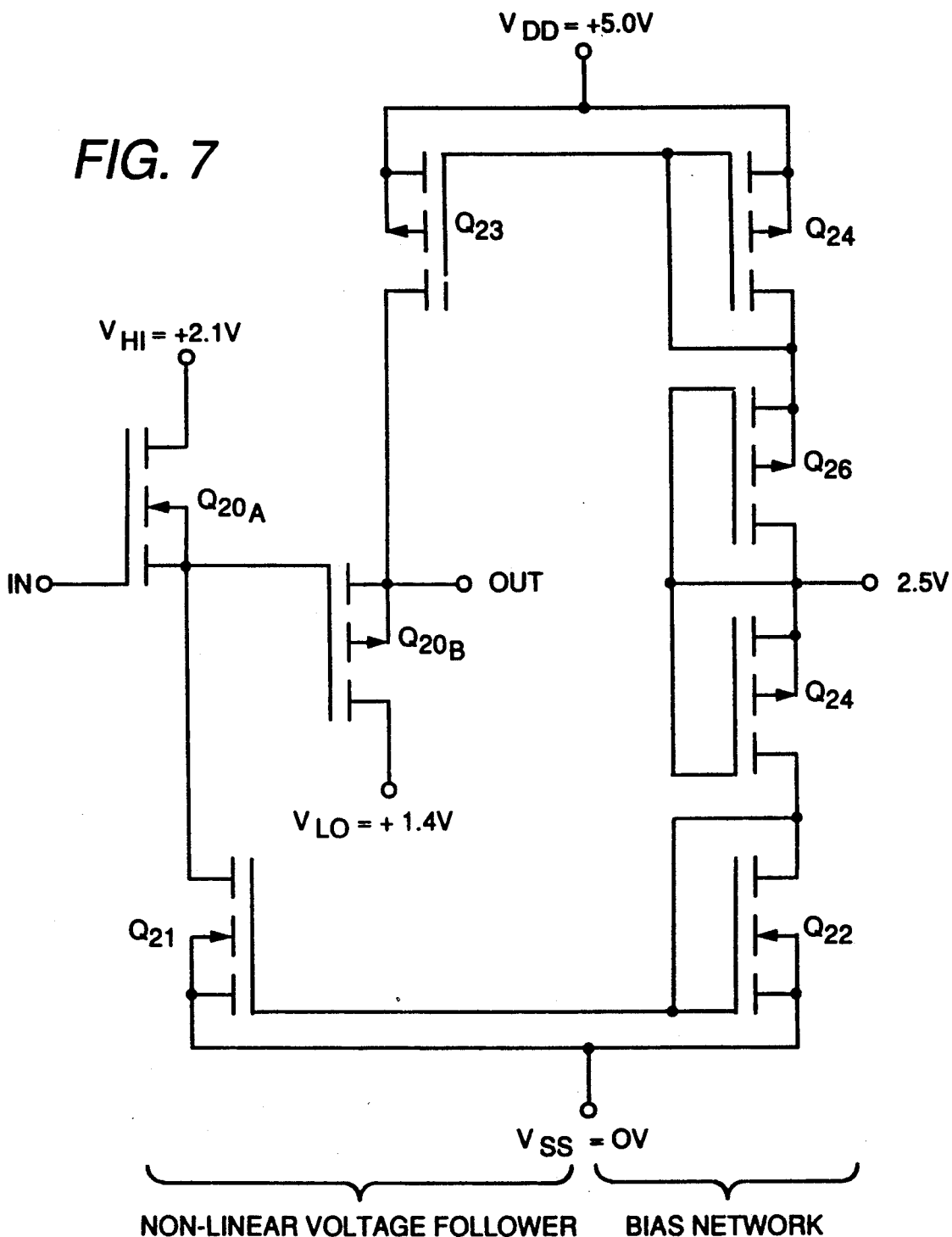
FIG. 7 is a schematic diagram of a voltage amplifier that can be used as a non-linear processor in neural net layers embodying the invention.

FIG. 7 shows non-linear voltage amplifier circuitry that can be used to implement each non-linear processor $NLP_j$ in FIG. 6. The FIG. 7 non-linear voltage amplifier is a cascade connection of two source-follower transistors, one ($Q_{20A}$) being an n-channel MOSFET and the other ($Q_{20B}$) being a p-channel MOSFET. $Q_{20A}$ is provided a constant-current generator source load by an n-channel MOSFET $Q_{21}$, which is the slave or output transistor of a current mirror amplifier including as its master or input transistor an n-channel MOSFET $Q_{22}$ self-biased by drain-to-gate feedback. $Q_{20B}$ is provided a constant-current generator source load by a p-channel MOSFET $Q_{23}$, which is the slave or output transistor of a current mirror amplifier including as its master or input transistor a p-channel MOSFET $Q_{24}$ self-biased by drain-to-gate feedback. $Q_{22}$ and $Q_{24}$ are connected as diodes by their respective drain-to-gate feedback connections, and these diodes are connected in series with another diode-connected n-channel MOSFET $Q_{25}$ and with another diode-connected p-channel MOSFET $Q_{26}$ between $V_{SS}$ and $V_{DD}$ potentials to implement a bias network. In this bias network a quiescent input current flows from the input port of the current mirror amplifier comprising $Q_{23}$, $Q_{24}$ into the input port of the current mirror amplifier comprising $Q_{21}$, $Q_{22}$. $Q_{21}$ and $Q_{23}$ drain current flows are similar-valued by current mirror amplifier action.

All the n-channel MOSFETs $Q_{20A}$, $Q_{21}$, $Q_{22}$ and $Q_{25}$ have similar channel widths and lengths and exhibit similar operating characteristics. All the p-channel MOSFETs $Q_{20B}$, $Q_{23}$, $Q_{24}$ and $Q_{26}$ have similar channel widths and lengths and exhibit similar operating characteristics, which are complementary to those of the n-channel MOSFETs. The bias network MOSFETs $Q_{22}$, $Q_{24}$, $Q_{25}$ and $Q_{26}$ may be shared by a plurality of the FIG. 7 non-linear voltage amplifier circuits to conserve hardware and operating power.

Non-linearity of response in the FIG. 7 voltage amplifier comes about because (1) source-follower action of $Q_{20A}$ for positive-going excursions of its gate electrode potential becomes limited as its source potential approaches its drain potential $V_{HI}$ and (2) source-follower action of $Q_{20B}$ for negative-going excursions of its gate electrode potential becomes limited as its source potential approaches its drain potential $V_{LO}$. At the source electrode of source-follower $Q_{20B}$ there is a sigmoidal response to a linear ramp potential applied to the gate electrode of source-follower $Q_{20A}$. The voltages $V_{LO}$ and $V_{HI}$ can be programmed to control the limiting properties of the FIG. 7 non-linear amplifier, and the voltages $V_{LO}$ and $V_{HI}$ may be selected to provide for symmetry of response or for asymmetry of response. FIG. 7 shows representative values for $V_{HI}$ and $V_{LO}$ that provide a substantially symmetrical response about $+2.5$ volts.

Thusfar, the reversal of sign in the weighting of the parallel sign bits of the bit-serial synapse input signals has been described as being done in the final weighted summation of the partial weighted summation results. Alternatively, in other embodiments of the invention, such as those now to be described, the reversal of sign in the weighting of the parallel sign bits of the bit-serial synapse input signals is done while performing the partial weighted summations.

FIG. 8 shows a modification of the FIG. 2 or FIG. 3 apparatus in which the multiplexers $MX_1$ ... $MX_M$, $MX_{(M+1)}$ ... $MX_{2M}$ that each select from between two operating voltages the voltage applied to a corresponding one of the input lines $IL_1$ ... $IL_M$, $IL_{(M+1)}$ ... $IL_{2M}$ are replaced by multiplexers $MX_1'$ ... $MX_M'$, $MX_{(M+1)}'$ ... $MX_{2M}'$ that each select from among the $V_{DD}$, $V_{SS}$ and $(V_{SS}+V_{DD})/2$ operating voltages the voltage applied to a corresponding one of the input lines $IL_1$ ... $IL_M$, $IL_{(M+1)}$ ... $IL_{2M}$. The current condition of the SIGN BIT FLAG is applied to each of the multiplexers $MX_i'$ and $MX_{(i+M)}'$ as its first control bit, and the current bit of a respective input voltage signal $x_i$ is applied to each of the multiplexers $MX_i'$ and $MX_{(i+M)}'$ as its second control signal.

For all bits of $x_i$ except its sign bits, the SIGN BIT FLAG is a ZERO. The SIGN BIT FLAG being a ZERO conditions multiplexer $MX_i'$ to respond to $x_i$ being a ONE to apply the $V_{DD}$ first operating voltage to an input line $IL_i$ and to respond to $x_i$ being a ZERO to apply the third operating voltage $(V_{SS}+V_{DD})/2$ to the input line $IL_i$. The SIGN BIT FLAG being a ZERO conditions multiplexer $MX_{(i+M)}'$ to respond to $x_i$ being a ONE to apply the $V_{SS}$ second operating voltage to an input line $IL_{(\pm+M)}$ and to respond to $x_i$ being a ZERO to apply the third operating voltage $(V_{SS}+V_{DD})/2$ to the input line $IL_{(i+M)}$.

When the sign bits of $x_i$ occur, the SIGN BIT FLAG is a ONE. The SIGN BIT FLAG being a ONE conditions multiplexer $MX_i'$ to respond to $x_i$ being a ONE to apply the $V_{SS}$ second operating voltage to an input line IL$_i$ and to respond to x$_i$ being a ZERO to apply the third operating voltage (V$_{SS}$+V$_{DD}$)/2 to the input line IL$_i$. The SIGN BIT FLAG being a ONE conditions multiplexer MX$_{(i+M)}$' to respond to x$_i$ being a ONE to apply the V$_{DD}$ first operating voltage to an input line IL$_{(i+M)}$ and to respond to x$_i$ being a ZERO to apply the third operating voltage (V$_{SS}$+V$_{DD}$)/2 to the input line IL$_{(i+M)}$. Accordingly, the reversal of sign in the weighting of the parallel sign bits of the bit-serial synapse input signals is done while performing the partial weighted summations.

Figure 9:
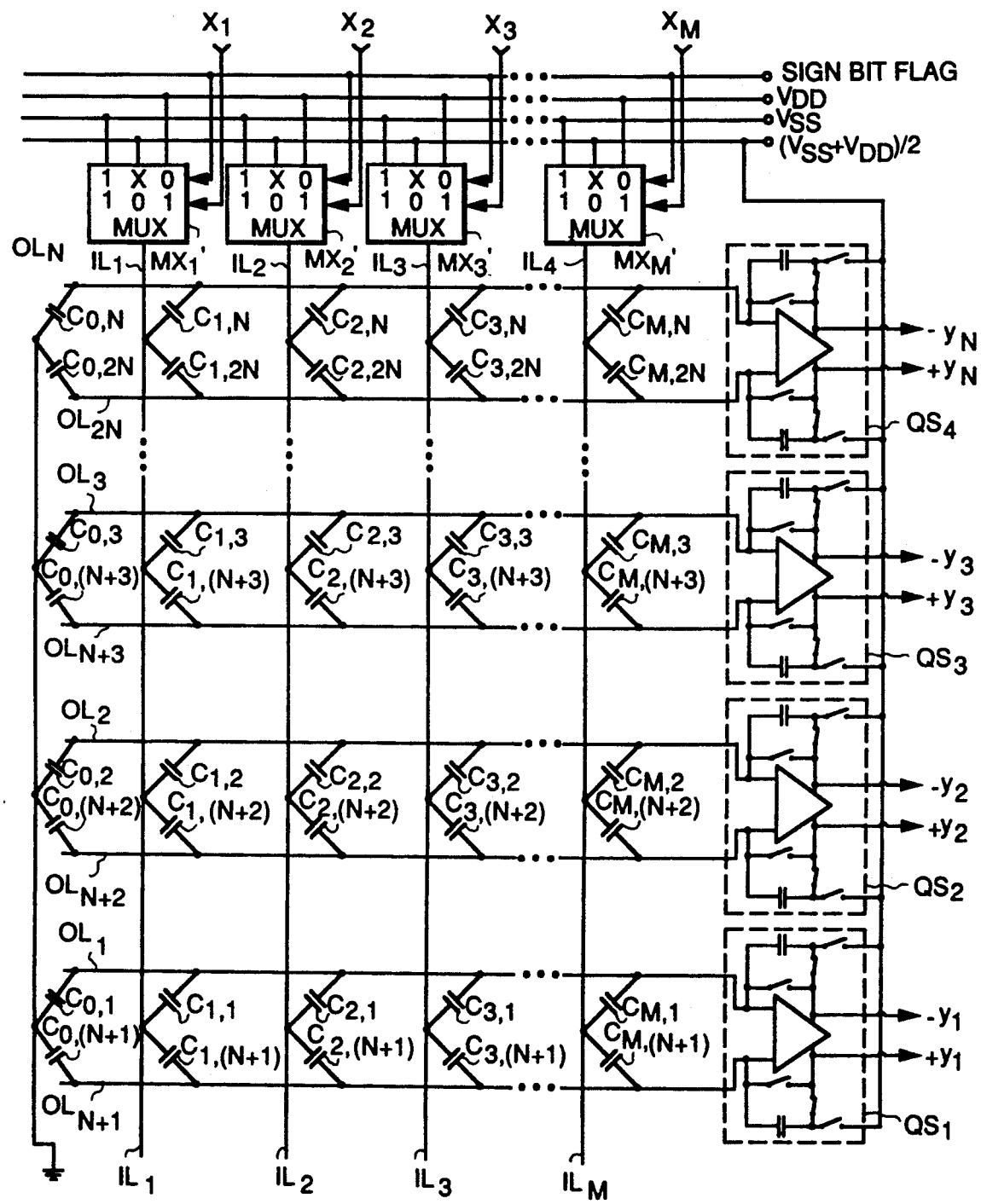

FIG. 9 shows a modification of the FIG. 4 apparatus in which the multiplexers MX$_1$, MX$_2$, MX$_3$, ... MX$_M$, that each select from between two operating voltages the voltage applied to a corresponding one of the input lines IL$_1$, IL$_2$, IL$_3$, ... IL$_M$ are replaced by multiplexers MXI MX$_2$', ... MX$_M$' that each select from among the V$_{DD}$, V$_{SS}$ and (V$_{SS}$+V$_{DD}$)/2 operating voltages the voltage applied to a corresponding one Of the input lines IL$_1$, IL$_2$, IL$_3$, ... IL$_M$. The multiplexers MX$_1$', MX$_2$', ... MX$_M$' are controlled in the FIG. 9 apparatus similarly to the way they are in FIG. 8 apparatus, again to provide the reversal of sign in the weighting of the parallel sign bits of the bit-serial synapse input signals while performing the partial weighted summations.

FIG. 10 shows the apparatus for performing the final weighted summation of partial weighted summation results from the FIG. 8 or 9 apparatus. The FIG. 10 apparatus differs from the FIG. 5 apparatus in that, for each value of j, one through N, the weighting capacitors C1$_j$, C2$_j$, C3$_j$ and C4$_j$ all connect to a single respective output line OL$_j$, so the sum of their respective charge conditions can be sensed on a single-ended basis. Single-ended charge sensing allows dispensing with the weighting capacitors C5$_j$, C6$_j$, C7$_j$ and C8$_j$. Single-ended charge sensing will also allow each of the charge sensing amplifiers QS$_{(N+j)}$ to be replaced by a simpler single-ended charge sensing amplifier such as that shown in FIG. 1. Where the FIG. 10 apparatus performs the final weighted summation of partial weighted summation results from the FIG. 8 apparatus, each of the charge sensing amplifiers QS$_j$ can also be replaced by a simpler single-ended charge sensing amplifier such as that shown in FIG. 1.

Figure 11:
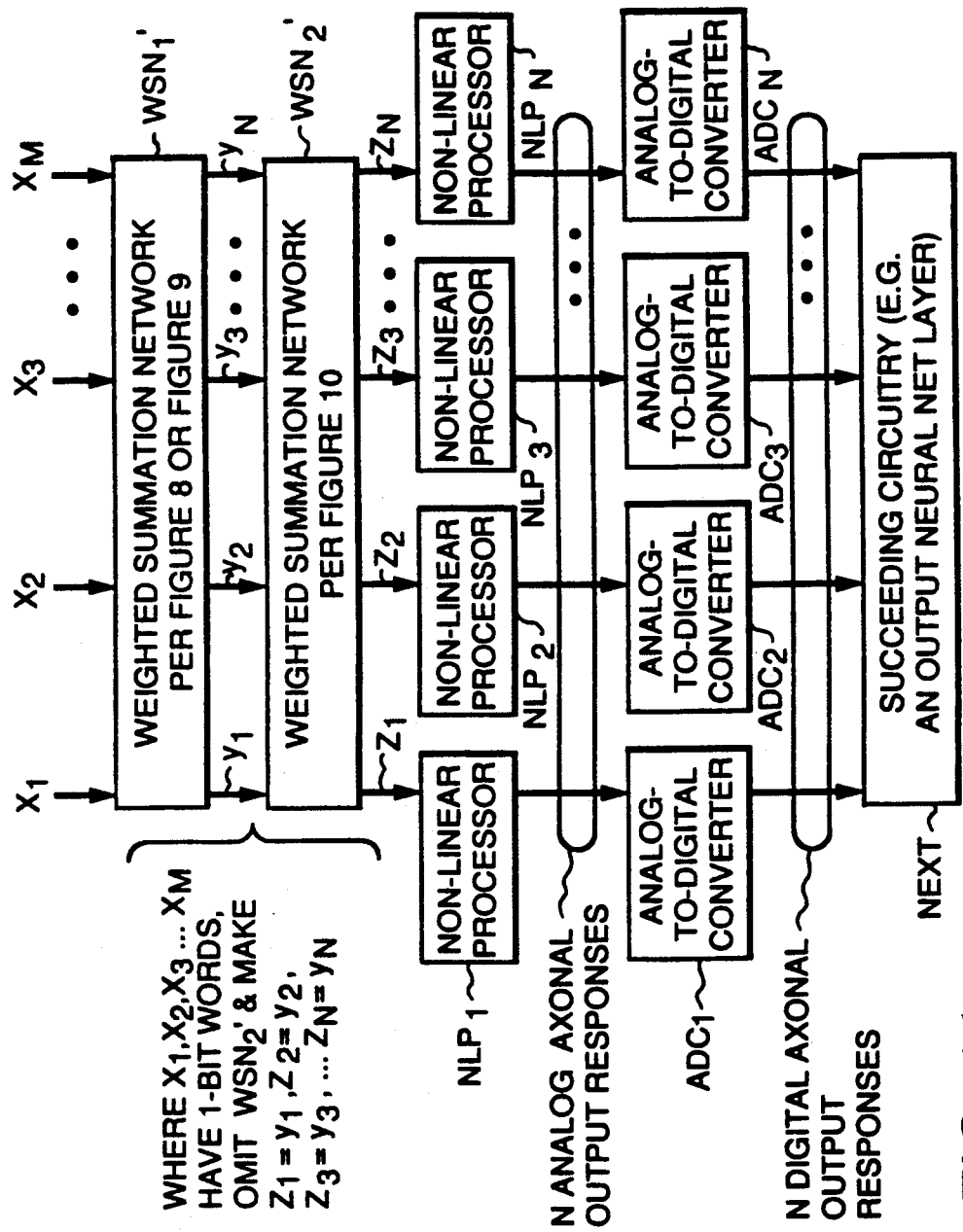
FIG. 11 is a schematic diagram of a neural net layer including either of the FIG. 8 and FIG. 9 apparatuses for performing a plurality of weighted summation procedures; possibly a FIG. 10 apparatus for performing a plurality of weighted summation procedures; an array of non-linear processors and an array of analog-to-digital converters, each of which alternative neural net layers embodies the invention in a respective one of its aspects.

FIG. 11 is a schematic diagram of a neural net layer similar to the neural net layer of FIG. 6, but includes either of the FIG. 8 and FIG. 9 apparatuses as a weighted summation network WSN$_1$' for performing a plurality of weighted summation procedures, so the reversal of sign in the weighting of the parallel sign bits of the bit-serial synapse input signals takes place in the weighted summation network WSN$_1$'. Where the weighted summation procedures performed in the weighted summation network WSN$_1$' generate partial weighted summation results, a weighted summation network WSN$_2$' comprising the FIG. 10 apparatus is used to generate final weighted summation results for application to an array of non-linear processors NLP$_1$, NLP$_2$, ... NLP$_N$. The non-linear processors NLP$_1$, NLP$_2$, ... NLP$_N$ have their analog axonal output signals digitized in respective analog-to-digital converters ADC$_1$, ADC$_2$, ... ADC$_N$, for application to the succeeding circuitry NEXT.

Figure 12:
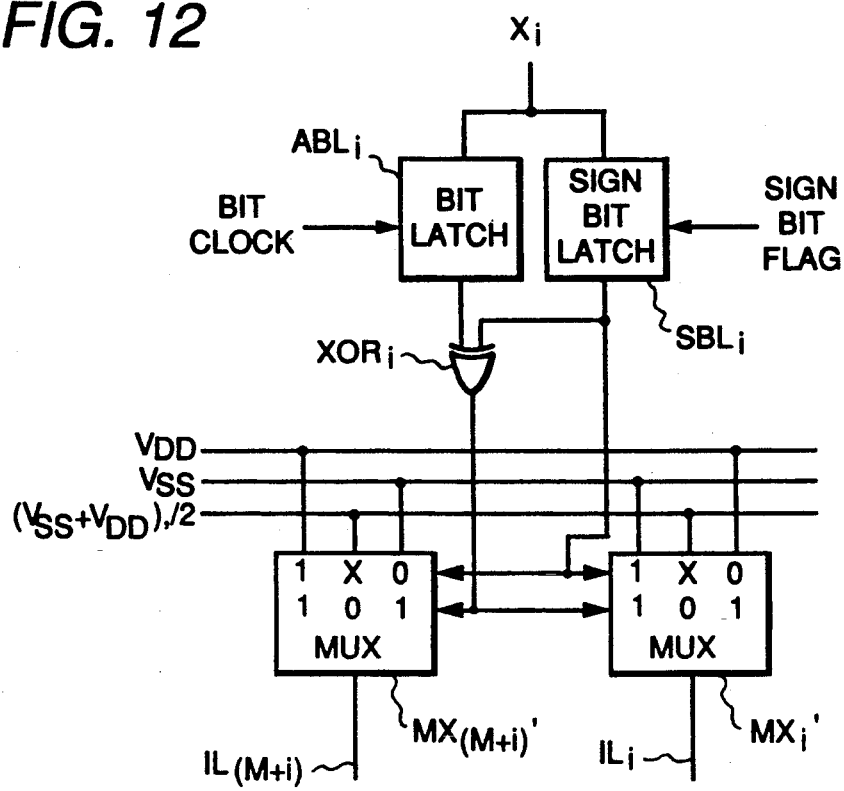
FIGS. 12 and 13 are schematic diagrams of respective modifications of the FIG. 11 neural net layer to adapt it for operation with one's complement synapse input signals rather than with two's complement synapse input signals.

FIG. 12 shows a modification made to the FIG. 8 apparatus in the FIG. 11 neural net layer in respect to each synapse input signal port. These modifications are made to adapt the FIG. 11 neural net layer for operation with one's complement, rather than with two's complement, bit-serial synapse input signals. The one's complement bit-serial synapse input signals are presumed to be ones in which the sign bit is the initial bit in a bit-serial word. Responsive to the SIGN BIT FLAG being a ONE, a respective bit latch SBL$_i$ latches the sign bit of x$_i$ to be held for the remainder of the bit-serial word when the SIGN BIT FLAG is a ZERO. Another bit latch ABL$_i$ clocked at bit rate latches each successive bit of x$_i$. The outputs of the bit latches SBL$_i$ and ABL$_i$ are applied as the two inputs of a two-input exclusive-OR gate XOR$_i$. If the sign bit stored in sign bit latch SBL$_i$ is a ZERO indicating x$_i$ to be positive, the exclusive-OR gate XOR$_i$ applies bits corresponding to the successive bits of x$_i$ as second control bits to the multiplexers MX$_i$' and MX$_{(i+M)}$'. Alternatively, if the sign bit stored in sign bit latch SBL$_i$ is a ONE indicating x$_i$ to be negative, the exclusive-OR gate XOR$_i$ applies bits corresponding to the bit complements of the successive bits of x$_i$ as second control bits to the multiplexers MX$_i$' and MX$_{(i+M)}$'.

When the SIGN BIT FLAG is a ONE during the initial bit of each bit-serial word, the bit latches SBL$_i$ and ABL$_i$ latch the same sign bit to each of the two inputs of exclusive-OR gate XOR$_i$, which responds with a ZERO output. This ZERO output is applied as the second control bit of each of the multiplexers MX$_i$' and MX$_{(i+M)}$', conditioning them to select (V$_{SS}$+V$_{DD}$)/2 to each of the input lines IL$_i$ and IL$_{(i+M)}$. This facilitates the resetting of the charge sensing amplifiers QS$_{(N+1)}$, QS$_{(N+2)}$, ... QS$_{2N}$ during the sign bit interval.

When adapting the FIG. 11 neural net layer for operation with one's complement bit-serial synapse input signals, the FIG. 10 sequencer SEQ is modified to omit weighting capacitors SH4$_j$ for the sign bit slice and the associated sample-and-hold circuits SH4$_j$. The FIG. 10 sequencer SEQ in the FIG. 11 neural net layer is also arranged to sequence sampling in the sample-and-hold circuits in accordance with the significances of the successive bits of the bit-serial x$_i$ words which follow.

Figure 13:
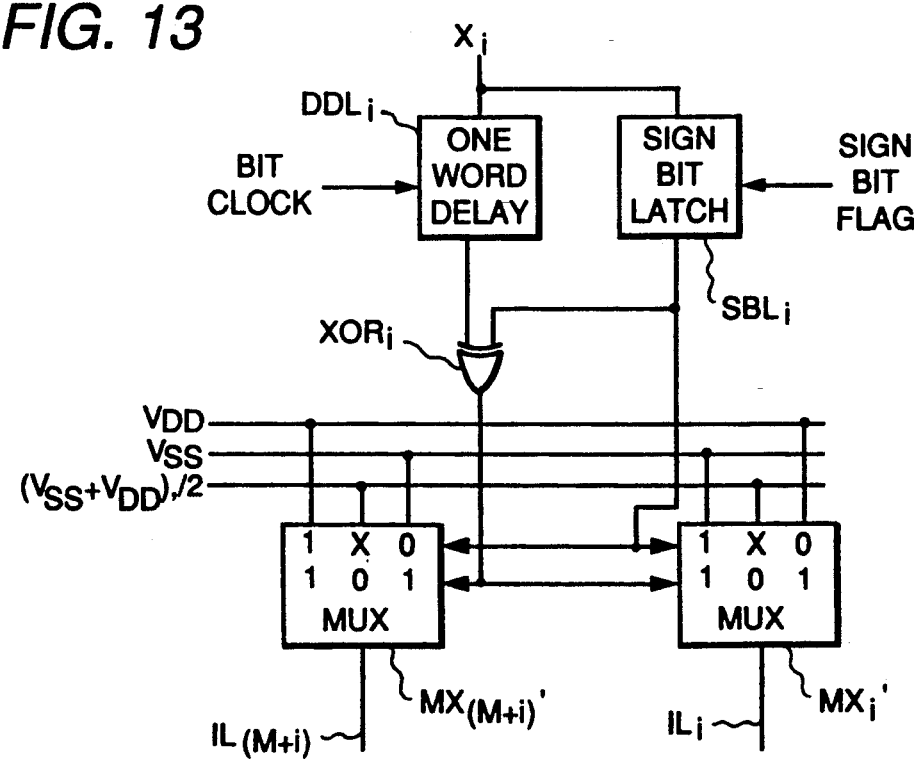

FIG. 13 shows a modification made to the FIG. 8 apparatus in the FIG. 11 neural net layer in respect to each synapse input signal port to facilitate operation with one's complement bit-serial synapse input signals in which the final bit in each bit-serial word is the sign bit. It differs from the FIG. 12 modification in that x$_i$ is delayed for the duration of one bit-serial word in a digital delay line DDL$_i$ before its application to the exclusive-OR gate XOR$_i$ bit latch ABL$_i$, so the sign bit latch SBL$_i$ can be written for temporarily storing the final sign bit of each bit-serial word to be applied to one input of the exclusive-OR gate XOR$_i$ throughout the interval that the other bits of that bit-serial word are successively applied to the other input of the exclusive-OR gate XOR$_i$. The clocking of the digital delay line DDL$_i$ and of the sign bit latch SBL$_i$ in FIG. 13 is arranged so that the exclusive-OR gate XOR$_i$ invariably provides a ZERO for application as second control bits to the multiplexers MX$_i$' and MX$_{(i+M)}$' during the time the SIGN BIT FLAG is a ONE, facilitating the resetting of the charge sensing amplifiers QS$_{(N+1)}$, QS$_{(N+2)}$, ... QS$_{2N}$. Again, the FIG. 10 sequencer SEQ in the FIG. 11 neural net layer is modified to omit weighting capacitors SH4$_j$ for the sign bit slice and the associated sample-and-hold circuits SH4$_j$. The FIG. 10 sequencer SEQ in the FIG. 11 neural net layer is also arranged to sequence sampling in the sample-and-hold circuits in accordance with the significances of the successive bits of the bit-serial $x_i$ words which follow.

One skilled in the art will by acquaintance with the foregoing disclosure be enabled to design a variety of digital systems incorporating analog weighted summation circuitry, and this should be borne in mind when construing the scope of the claims which follow.

What is claimed is:

1. A system for performing N weighted summations of single-bit digital input signals, M in number, identified by respective ones of consecutive ordinal numbers first through $M^{th}$, N being an integer greater than zero and M being an integer greater than one, said system comprising:

M pairs of input lines, said input lines identified by respective ones of consecutive ordinal numbers first through $2M^{th}$, each pair including input lines identified by ordinal numbers M apart and each pair being identified by the same ordinal number as the lower of the ordinal numbers identifying the input lines in said pair;

respective means respectively responding to said first through $M^{th}$ single-bit digital input signals being ONE, for placing a first prescribed voltage level on the input line identified by the corresponding ordinal number and placing a second prescribed voltage level on the input line identified by the ordinal number M higher;

respective means respectively responding to said first through $M^{th}$ single-bit digital input signals being ZERO, for placing said second prescribed voltage level on the input line identified by the corresponding ordinal number and placing said first prescribed voltage level on the input line identified by the ordinal number M higher;

N output lines identified by respective ones of consecutive ordinal numbers first through $N^{th}$;

a plurality of weighting capacitors having respective first plates and second plates, each of said weighting capacitors having its first plate connected to one of said first through $2M^{th}$ input lines and having its second plate connected to one of said first through $N^{th}$ output lines; and N charge sensing means identified by respective ones of consecutive ordinal numbers first through $N^{th}$, each connected for sensing the charge on said output line identified by the same ordinal number it is and responding to generate a respective result of performing N weighted summations of said first through $M^{th}$ single-bit digital input signals.

2. A system for performing N weighted summations of single-bit digital input signals as set forth in claim 1 connected in a neural net layer with:

N non-linear processors identified by respective ones of consecutive ordinal numbers first through $N^{th}$, each having a sigmoidal transfer characteristic and receptive of a respective result of performing N weighted summations of said first through $M^{th}$ single-bit digital input signals to generate a respective axonal response.

3. A system for performing N weighted summations of single-bit digital input signals connected in a neural net layer, as set forth in claim 2, including:

means for digitizing the axonal responses of said first through $N^{th}$ non-linear processors.

4. A system for performing N weighted summations of single-bit digital input signals, M in number, identified by respective ones of consecutive ordinal numbers first through $M^{th}$, N being an integer greater than zero and M being an integer greater than one, said system comprising:

M pairs of input lines, said input lines identified by respective ones of consecutive ordinal numbers first through $2M^{th}$, each pair including input lines identified by ordinal numbers M apart and each pair being identified by the same ordinal number as the lower of the ordinal numbers identifying the input lines in said pair;

respective means respectively responding to said first through $M^{th}$ single-bit digital input signals being ONE, for placing a first prescribed voltage level on the input line identified by the corresponding ordinal number and placing a second prescribed voltage level on the input line identified by the ordinal number M higher;

respective means respectively responding to said first through $M^{th}$ single-bit digital input signals being ZERO, for placing a third voltage level both on the input line identified by the corresponding ordinal number and on the input line identified by the ordinal number M higher, said third voltage level being midway between said first and second prescribed voltage levels;

N output lines identified by respective ones of consecutive ordinal numbers first through $N^{th}$;

a plurality of weighting capacitors having respective first plates and second plates, each of said weighting capacitors having its first plate connected to one of said first through $2M^{th}$ input lines and having its second plate connected to one of said first through $N^{th}$ output lines; and N charge sensing means identified by respective ones of consecutive ordinal numbers first through $N^{th}$, each connected for sensing the charge on said output line identified by the same ordinal number it is and responding to generate a respective result of performing N weighted summations of said first through $M^{th}$ single-bit digital input signals.

5. A system for performing N weighted summations of single-bit digital input signals as set forth in claim 4 connected in a neural net layer with:

N non-linear processors identified by respective ones of consecutive ordinal numbers first through $N^{th}$, each having a sigmoidal transfer characteristic and receptive of a respective result of performing N weighted summations of said first through $M^{th}$ single-bit digital input signals to generate a respective axonal response.

6. A system for performing N weighted summations of single-bit digital input signals connected in a neural net layer, as set forth in claim 5, including:

means for digitizing the axonal responses of said first through $N^{th}$ non-linear processors.

7. A system for performing N weighted summations of single-bit digital input signals, M in number, identified by respective ones of consecutive ordinal numbers first through $M^{th}$, N being an integer greater than zero and M being an integer greater than one, said system comprising:

N pairs of output lines, said output lines identified by respective ones of consecutive ordinal numbers first through $2N^{th}$, each pair including output lines identified by ordinal numbers N apart and each pair being identified by the same ordinal number as the lower of the ordinal numbers identifying the output lines in said pair;

M input lines, said input lines identified by respective ones of consecutive ordinal numbers first through $N^{th}$;

respective means respectively responding to said first through $M^{th}$ single-bit digital input signals being ZERO, for placing a first prescribed voltage level on the input line identified by the corresponding ordinal number;

respective means respectively responding to said first through $M^{th}$ single-bit digital input signals being ONE, for placing a second voltage level on the input line identified by the corresponding ordinal number;

a plurality of weighting capacitors having respective first plates and second plates, each of said weighting capacitors having its first plate connected to one of said first through $2N^{th}$ output lines and having its second plate connected to one of said first through $M^{th}$ input lines;

N charge sensing means identified by respective ones of consecutive ordinal numbers first through $N^{th}$, each of said first through $N^{th}$ charge sensing means connected for sensing the differential charge between said output line identified by the same ordinal number it is and said output line identified by the ordinal number N higher, of said first through $N^{th}$ charge sensing means responding to generate a respective result of performing N weighted summations of said first through $M^{th}$ single-bit digital input signals; and means for periodically zeroing said system during which periods of zeroing said system said first prescribed voltage level is applied to the first and second plates of each of said plurality of weighting capacitors.

8. A system for performing N weighted summations of single-bit digital input signals as set forth in claim 7 connected in a neural net layer with:

N non-linear processors identified by respective ones of consecutive ordinal numbers first through $N^{th}$, each having a sigmoidal transfer characteristic and receptive of a respective result of performing N weighted summations of said first through $M^{th}$ single-bit digital input signals to generate a respective axonal response.

9. A system for performing N weighted summations of single-bit digital input signals connected in a neural net layer, as set forth in claim 8, including:

means for digitizing the axonal responses of said first through $N^{th}$ non-linear processors.

10. A system for performing N weighted summations of plural-bit digital input signals, M in number, identified by respective ones of consecutive ordinal numbers first through $M^{th}$, N being an integer greater than zero and M being an integer greater than one, each of said M plural-bit digital input signals having B bits in each successive word thereof, B being an integer at least two, said system comprising:

a plurality N in number of analog weighted summers identified by respective ones of consecutive ordinal numbers first through $N^{th}$, each of a type for receiving M analog input signals in parallel to generate a respective analog output signal;

means for bit-slicing each successive word of said first through $M^{th}$ plural-bit digital input signals to supply B sequential sets of M analog input signals to each of said plurality of analog weighted summers, each bit slice being of a different weight and causing the generation of N corresponding analog output signals of said different weight from said plurality of analog weighted summers; and a plurality N in number of further analog weighted summers identified by respective ones of consecutive ordinal numbers $(N+1)^{th}$ through $2N^{th}$, each of a type for receiving B analog input signals sequentially to generate a respective analog output signal, each connected to receive its B analog input signals from said analog weighted summer identified by the ordinal number N lower than its own ordinal number, and each supplying a respective final weighted summation result.

11. A system for performing N weighted summations of plural-bit digital input signals as set forth in claim 10 connected in a neural net layer with:

N non-linear processors, each having a sigmoidal transfer characteristic and receptive of a respective final weighted summation result, to generate a respective axonal response.

12. A system for performing N weighted summations of plural-bit digital input signals connected in a neural net layer, as set forth in claim 11, including:

means for digitizing the axonal responses of said first through $N^{th}$ non-linear processors.

13. A system for performing N weighted summations of plural-bit digital input signals, M in number, identified by respective ones of consecutive ordinal numbers first through $M^{th}$, N being an integer greater than zero and M being an integer greater than one, each of said M plural-bit digital input signals having B bits in each successive word thereof, B being an integer at least two, said system comprising:

M pairs of input lines, said input lines identified by respective ones of consecutive ordinal numbers first through $2M^{th}$, each pair including input lines identified by ordinal numbers M apart and each pair being identified by the same ordinal number as the lower of the ordinal numbers identifying the input lines in said pair;

respective means for sequentially supplying bit slices of temporally aligned words of said first through $M^{th}$ digital input signals, the successive bit slices of each of the successive words of each of said first through $M^{th}$ digital input signals being consecutively ordinarily numbered first through $B^{th}$ in order of their occurrence;

respective means respectively responding to current bits of said first through $M^{th}$ single-bit digital input signals being ONE, for placing a first prescribed voltage level on the input line identified by the corresponding ordinal number and placing a second prescribed voltage level on the input line identified by the ordinal number M higher;

respective means respectively responding to current bits of said first through $M^{th}$ single-bit digital input signals being ZERO, for placing said second prescribed voltage level on the input line identified by the corresponding ordinal number and placing said first prescribed voltage level on the input line identified by the ordinal number M higher;

N output lines identified by respective ones of consecutive ordinal numbers first through $N^{th}$;

a plurality of weighting capacitors having respective first plates and second plates, each of said weighting capacitors having its first plate connected to one of said first through $2M^{th}$ input lines and having its second plate connected to one of said first through N$^{th}$ output lines;

N charge sensing means identified by respective ones of consecutive ordinal numbers first through N$^{th}$, each connected for sensing the charge on said output line identified by the same ordinal number it is and responding to that charge for each of said first through B$^{th}$ bit slices to generate a respective set of first through B$^{th}$ partial weighted summation results of performing N weighted summations of said first through M$^{th}$ single-bit digital input signals; and N means for performing a weighted summation identified by respective ones of consecutive ordinal numbers first through N$^{th}$, each said means for performing a weighted summation performing a weighted summation of a respective said set of first through B$^{th}$ partial weighted summation results as sequentially generated by said charge sensing means identified by the same ordinal number, the weights afforded each of the B partial weighted summation results in each said means for performing a weighted summation having the same significances as the bit slices generating each of the B partial weighted summation results.

14. A system for performing N weighted summations of plural-bit digital input signals as set forth in claim 13 connected in a neural net layer with:

N non-linear processors, each having a sigmoidal transfer characteristic and receptive of a respective result of performing a weighted summations of a respective said set of first through B$^{th}$ partial weighted summation results, to generate a respective axonal response.

15. A system for performing N weighted summations of plural-bit digital input signals connected in a neural net layer, as set forth in claim 14, including:

means for digitizing the axonal responses of said first through N$^{th}$ non-linear processors.

16. A system for performing N weighted summations of plural-bit digital input signals, M in number, identified by respective ones of consecutive ordinal numbers first through M$^{th}$, N being an integer greater than zero and M being an integer greater than one, each of said M plural-bit digital input signals having B bits in each successive word thereof, B being an integer at least two, said system comprising:

M pairs of input lines, said input lines identified by respective ones of consecutive ordinal numbers first through 2M$^{th}$, each pair including input lines identified by ordinal numbers M apart and each pair being identified by the same ordinal number as the lower of the ordinal numbers identifying the input lines in said pair;

respective means for sequentially supplying bit slices of temporally aligned words of said first through M$^{th}$ digital input signals, the successive bit slices of each of the successive words of each of said first through M$^{th}$ digital input signals being consecutively ordinarily numbered first through B$^{th}$ in order of their occurrence;

respective means respectively responding to current bits of said first through M$^{th}$ single-bit digital input signals being ONE, for placing a first prescribed voltage level on the input line identified by the corresponding ordinal number and placing a second prescribed voltage level on the input line identified by the ordinal number M higher;

respective means respectively responding to current bits of said first through M$^{th}$ single-bit digital input signals being ZERO, for placing a third voltage level both on the input line identified by the corresponding ordinal number and on the input line identified by the ordinal number M higher, said third voltage level being midway between said first and second prescribed voltage levels;

N output lines identified by respective ones of consecutive ordinal numbers first through N$^{th}$;

a plurality of weighting capacitors having respective first plates and second plates, each of said weighting capacitors having its first plate connected to one of said first through 2M$^{th}$ input lines and having its second plate connected to one of said first through N$^{th}$ output lines;

N charge sensing means identified by respective ones of consecutive ordinal numbers first through N$^{th}$, each connected for sensing the charge on said output line identified by the same ordinal number it is and responding to that charge for each of said first through B$^{th}$ bit slices to generate a respective set of first through B$^{th}$ partial weighted summation results of performing N weighted summations of said first through M$^{th}$ single-bit digital input signals; and N means for performing a weighted summation identified by respective ones of consecutive ordinal numbers first through N$^{th}$, each said means for performing a weighted summation performing a weighted summation of a respective said set of first through B$^{th}$ partial weighted summation results as sequentially generated by said charge sensing means identified by the same ordinal number, the weights afforded each of the B partial weighted summation results in each said means for performing a weighted summation having the same significances as the bit slices generating each of the B partial weighted summation results.

17. A system for performing N weighted summations of plural-bit digital input signals as set forth in claim 16 connected in a neural net layer with:

N non-linear processors, each having a sigmoidal transfer characteristic and receptive of a respective result of performing a weighted summations of a respective said set of first through B$^{th}$ partial weighted summation results, to generate a respective axonal response.

18. A system for performing N weighted summations of plural-bit digital input signals connected in a neural net layer, as set forth in claim 17, including:

means for digitizing the axonal responses of said first through N$^{th}$ non-linear processors.

19. A system for performing N weighted summations of plural-bit digital input signals, M in number, identified by respective ones of consecutive ordinal numbers first through M$^{th}$, N being an integer greater than zero and M being an integer greater than one, each of said M plural-bit digital input signals having B bits in each successive word thereof, B being an integer at least two, said system comprising:

M input lines, said input lines identified by respective ones of consecutive ordinal numbers first through M$^{th}$;

respective means for sequentially supplying bit slices of temporally aligned words of said first through M$^{th}$ digital input signals, the successive bit slices of each of the successive words of each of said first through M$^{th}$ digital input signals being consecutively ordinarily numbered first through $B^{th}$ in order of their occurrence;

respective means respectively responding to current bits of said first through $M^{th}$ single-bit digital input signals being ONE, for placing a first prescribed voltage level on the input line identified by the corresponding ordinal number;

respective means respectively responding to current bits of said first through $M^{th}$ single-bit digital input signals being ZERO, for placing a second voltage level on the input line identified by the corresponding ordinal number;

N pairs of output lines, said output lines identified by respective ones of consecutive ordinal numbers first through $2N^{th}$, each pair including output lines identified by ordinal numbers N apart and each pair being identified by the same ordinal number as the lower of the ordinal numbers identifying the output lines in said pair;

a plurality of weighting capacitors having respective first plates and second plates, each of said weighting capacitors having its first plate connected to one of said first through $2N^{th}$ output lines and having its second plate connected to one of said first through $M^{th}$ input lines;

means for biasing each of said plurality of weighting capacitors for storing no charge when said second voltage level is applied to its second plate;

N charge sensing means identified by respective ones of consecutive ordinal numbers first through $N^{th}$, each connected for sensing the difference between the charge on said output line identified by the same ordinal number it is and the charge on said output line identified by the ordinal number N higher and responding to that differential charge for each of said first through $B^{th}$ bit slices to generate a respective set of first through $B^{th}$ partial weighted summation results of performing N weighted summations of said first through $M^{th}$ single-bit digital input signals; and N means for performing a weighted summation identified by respective ones of consecutive ordinal numbers first through $N^{th}$, each said means for performing a weighted summation performing a weighted summation of a respective said set of first through $B^{th}$ partial weighted summation results as sequentially generated by said charge sensing means identified by the same ordinal number, the weights afforded each of the B partial weighted summation results in each said means for performing a weighted summation having the same significances as the bit slices generating each of the B partial weighted summation results.

20. A system for performing N weighted summations of plural-bit digital input signals as set forth in claim 19 connected in a neural net layer with:

N non-linear processors, each having a sigmoidal transfer characteristic and receptive of a respective result of performing a weighted summations of a respective said set of first through $B^{th}$ partial weighted summation results, to generate a respective axonal response.

21. A system for performing N weighted summations of plural-bit digital input signals connected in a neural net layer, as set forth in claim 20, including:

means for digitizing the axonal responses of said first through $N^{th}$ non-linear processors.

22. A system for performing N weighted summations of plural-bit digital input signals, M in number, identified by respective ones of consecutive ordinal numbers first through $M^{th}$, N being an integer greater than zero and M being an integer greater than one, each of said M plural-bit digital input signals having B bits in each successive word thereof, B being an integer at least two, said system comprising:

M pairs of input lines, said input lines identified by respective ones of consecutive ordinal numbers first through $2M^{th}$, each pair including input lines identified by ordinal numbers M apart and each pair being identified by the same ordinal number as the lower of the ordinal numbers identifying the input lines in said pair;

respective means for sequentially supplying bit slices of temporally aligned words of said first through $M^{th}$ digital input signals, the successive bit slices of each of the successive words of each of said first through $M^{th}$ digital input signals being consecutively ordinarily numbered first through $B^{th}$ in order of their occurrence;

means for generating a sign bit flag signal that has a first value only during sign bit slices and that has a second value during all other bit slices;

respective means respectively responding to current bits of said first through $M^{th}$ single-bit digital input signals being ONE at the same time as said sign bit flag signal has its second value, for placing a first prescribed voltage level on the input line identified by the corresponding ordinal number and placing a second prescribed voltage level on the input line identified by the ordinal number M higher;

respective means respectively responding to current bits of said first through $M^{th}$ single-bit digital input signals being ZERO at the same time as said sign bit flag signal has its second value, for placing said second prescribed voltage level on the input line identified by the corresponding ordinal number and placing said first prescribed voltage level on the input line identified by the ordinal number M higher;

means responding to said sign bit flag signal having its first value for applying a third prescribed voltage level, which is midway between said first and second prescribed voltage levels, to each of said first through $2M^{th}$ input lines;

N output lines identified by respective ones of consecutive ordinal numbers first through $N^{th}$;

a plurality of weighting capacitors having respective first plates and second plates, each of said weighting capacitors having its first plate connected to one of said first through $2M^{th}$ input lines and having its second plate connected to one of said first through $N^{th}$ output lines;

N charge sensing means identified by respective ones of consecutive ordinal numbers first through $N^{th}$, each connected for sensing the charge on said output line identified by the same ordinal number it is and responding to that charge for each of said first through $B^{th}$ bit slices to generate a respective set of first through $B^{th}$ partial weighted summation results of performing N weighted summations of said first through $M^{th}$ single-bit digital input signals; and N means for performing a weighted summation identified by respective ones of consecutive ordinal numbers first through $N^{th}$, each said means for performing a weighted summation performing a weighted summation of a respective said set of first through $B^{th}$ partial weighted summation results as sequentially generated by said charge sensing means identified by the same ordinal number, the weights afforded each of the B partial weighted summation results in each said means for performing a weighted summation having the same significances as the bit slices generating each of the B partial weighted summation results.

23. A system for performing N weighted summations of plural-bit digital input signals as set forth in claim 22 connected in a neural net layer with:

N non-linear processors, each having a sigmoidal transfer characteristic and receptive of a respective result of performing a weighted summations of a respective said set of first through $B^{th}$ partial weighted summation results, to generate a respective axonal response.

24. A system for performing N weighted summations of plural-bit digital input signals connected in a neural net layer, as set forth in claim 23, including:

means for digitizing the axonal responses of said first through $N^{th}$ non-linear processors.

25. A system for performing N weighted summations of plural-bit digital input signals, M in number, identified by respective ones of consecutive ordinal numbers first through $M^{th}$, N being an integer greater than zero and M being an integer greater than one, each of said M plural-bit digital input signals having B bits in each successive word thereof, B being an integer at least two, said system comprising:

M input lines, said input lines identified by respective ones of consecutive ordinal numbers first through $M^{th}$;

respective means for sequentially supplying bit slices of temporally aligned words of said first through $M^{th}$ digital input signals, the successive bit slices of each of the successive words of each of said first through $M^{th}$ digital input signals being consecutively ordinarily numbered first through $B^{th}$ in order of their occurrence;

means for generating a sign bit flag signal that has a first value only during sign bit slices and that has a second value during all other bit slices;

respective means respectively responding to current bits of said first through $M^{th}$ single-bit digital input signals being ONE at the same time as said sign bit flag signal has its second value, for placing a first prescribed voltage level on the input line identified by the corresponding ordinal number;

respective means respectively responding to current bits of said first through $M^{th}$ single-bit digital input signals being ZERO at the same time as said sign bit flag signal has its second value, for placing a second voltage level on the input line identified by the corresponding ordinal number;

means responding to said sign bit flag signal having its first value for applying a third prescribed voltage level, which is midway between said first and second prescribed voltage levels, to each of said first through $M^{th}$ input lines;

N pairs of output lines, said output lines identified by respective ones of consecutive ordinal numbers first through $2N^{th}$, each pair including output lines identified by ordinal numbers N apart and each pair being identified by the same ordinal number as the lower of the ordinal numbers identifying the output lines in said pair;

a plurality of weighting capacitors having respective first plates and second plates, each of said weighting capacitors having its first plate connected to one of said first through $2N^{th}$ output lines and having its second plate connected to one of said first through $M^{th}$ input lines;

means for biasing each of said plurality of weighting capacitors for storing no charge when said second voltage level is applied to its second plate;

N charge sensing means identified by respective ones of consecutive ordinal numbers first through $N^{th}$, each connected for sensing the difference between the charge on said output line identified by the same ordinal number it is and the charge on said output line identified by the ordinal number N higher and responding to that differential charge for each of said first through $B^{th}$ bit slices to generate a respective set of first through $B^{th}$ partial weighted summation results of performing N weighted summations of said first through $M^{th}$ single-bit digital input signals; and N means for performing a weighted summation identified by respective ones of consecutive ordinal numbers first through $N^{th}$, each said means for performing a weighted summation performing a weighted summation of a respective said set of first through $B^{th}$ partial weighted summation results as sequentially generated by said charge sensing means identified by the same ordinal number, the weights afforded each of the B partial weighted summation results in each said means for performing a weighted summation having the same significances as the bit slices generating each of the B partial weighted summation results.

26. A system for performing N weighted summations of plural-bit digital input signals as set forth in claim 25 connected in a neural net layer with:

N non-linear processors, each having a sigmoidal transfer characteristic and receptive of a respective result of performing a weighted summations of a respective said set of first through $B^{th}$ partial weighted summation results, to generate a respective axonal response.

27. A system for performing N weighted summations of plural-bit digital input signals connected in a neural net layer, as set forth in claim 26, including:

means for digitizing the axonal responses of said first through $N^{th}$ non-linear processors.

28. A system for performing N weighted summations of plural-bit one's complement digital input signals, M in number, identified by respective ones of consecutive ordinal numbers first through $M^{th}$, N being an integer greater than zero and M being an integer greater than one, each of said M plural-bit digital input signals having B bits in each successive word thereof, B being an integer at least two, said system comprising:

M pairs of input lines, said input lines identified by respective ones of consecutive ordinal numbers first through $2M^{th}$, each pair including input lines identified by ordinal numbers M apart and each pair being identified by the same ordinal number as the lower of the ordinal numbers identifying the input lines in said pair;

respective means for repeatedly supplying the sign bit slices of temporally aligned words of said first through $M^{th}$ digital input signals while sequentially supplying their other bit slices, the successive other bit slices of each of the successive words of each of said first through $M^{th}$ digital input signals being consecutively ordinarily numbered first through $(B-1)^{th}$ in order of their occurrence, the first of said bit slices being a sign bit slice;

respective means respectively responding to current bits of said first through $M^{th}$ single-bit digital input signals being ONE at the same time as said sign bit slice is a ZERO, for placing a first prescribed voltage level on the input line identified by the corresponding ordinal number and placing a second prescribed voltage level on the input line identified by the ordinal number M higher;

respective means respectively responding to current bits of said first through $M^{th}$ single-bit digital input signals being ONE at the same time as said sign bit slice is a ONE, for placing said second prescribed voltage level on the input line identified by the corresponding ordinal number and placing said first prescribed voltage level on the input line identified by the ordinal number M higher;

respective means respectively responding to current bits of said first through $M^{th}$ single-bit digital input signals being ZERO at the same time as said sign bit slice is a ZERO, for placing said second prescribed voltage level on the input line identified by the corresponding ordinal number and placing said first prescribed voltage level on the input line identified by the ordinal number M higher;

respective means respectively responding to current bits of said first through $M^{th}$ single-bit digital input signals being ZERO at the same time as said sign bit slice is a ONE, for placing a first prescribed voltage level on the input line identified by the corresponding ordinal number and placing a second prescribed voltage level on the input line identified by the ordinal number M higher;

N output lines identified by respective ones of consecutive ordinal numbers first through $N^{th}$;

a plurality of weighting capacitors having respective first plates and second plates, each of said weighting capacitors having its first plate connected to one of said first through $2M^{th}$ input lines and having its second plate connected to one of said first through $N^{th}$ output lines;

N charge sensing means identified by respective ones of consecutive ordinal numbers first through $N^{th}$, each connected for sensing the charge on said output line identified by the same ordinal number it is and responding to that charge for each of said first through $(B-1)^{th}$ other bit slices to generate a respective set of first through $(B-1)^{th}$ partial weighted summation results of performing N weighted summations of said first through $M^{th}$ single-bit digital input signals; and N means for performing a weighted summation identified by respective ones of consecutive ordinal numbers first through $N^{th}$, each said means for performing a weighted summation performing a weighted summation of a respective said set of first through $(B-1)^{th}$ partial weighted summation results as sequentially generated by said charge sensing means identified by the same ordinal number, the weights afforded each of the $(B-1)$ partial weighted summation results in each said means for performing a weighted summation having the same significances as the bit slices generating each of the $(B-1)$ partial weighted summation results.

29. A system for performing N weighted summations of plural-bit digital input signals as set forth in claim 28 connected in a neural net layer with:
N non-linear processors, each having a sigmoidal transfer characteristic and receptive of a respective result of performing a weighted summations of a respective said set of first through $B^{th}$ partial weighted summation results, to generate a respective axonal response.

30. A system for performing N weighted summations of plural-bit digital input signals connected in a neural net layer, as set forth in claim 29, including:
means for digitizing the axonal responses of said first through $N^{th}$ non-linear processors.

31. A system for performing N weighted summations of plural-bit one's complement digital input signals, M in number, identified by respective ones of consecutive ordinal numbers first through $M^{th}$, N being an integer greater than zero and M being an integer greater than one, each of said M plural-bit digital input signals having B bits in each successive word thereof, B being an integer at least two, said system comprising:

M input lines, said input lines identified by respective ones of consecutive ordinal numbers first through $M^{th}$;

respective means for repeatedly supplying the sign bit slices of temporally aligned words of said first through $M^{th}$ digital input signals while sequentially supplying their other bit slices, the successive other bit slices of each of the successive words of each of said first through $M^{th}$ digital input signals being consecutively ordinarily numbered first through $(B-1)^{th}$ in order of their occurrence;

respective means respectively responding to current bits of said first through $M^{th}$ single-bit digital input signals being ONE at the same time as said sign bit slice is a ZERO, for placing a first prescribed voltage level on the input line identified by the corresponding ordinal number;

respective means respectively responding to current bits of said first through $M^{th}$ single-bit digital input signals being ONE at the same time as said sign bit slice is a ONE, for placing a second prescribed voltage level on the input line identified by the corresponding ordinal number;

respective means respectively responding to current bits of said first through $M^{th}$ single-bit digital input signals being ZERO at the same time as said sign bit slice is a ZERO, for placing said second voltage level on the input line identified by the corresponding ordinal number;

respective means respectively responding to current bits of said first through $M^{th}$ single-bit digital input signals being ZERO at the same time as said sign bit slice is a ONE, for placing said first voltage level on the input line identified by the corresponding ordinal number;

N pairs of output lines, said output lines identified by respective ones of consecutive ordinal numbers first through $2N^{th}$, each pair including output lines identified by ordinal numbers N apart and each pair being identified by the same ordinal number as the lower of the ordinal numbers identifying the output lines in said pair;

a plurality of weighting capacitors having respective first plates and second plates, each of said weighting capacitors having its first plate connected to one of said first through $2N^{th}$ output lines and having its second plate connected to one of said first through $M^{th}$ input lines;

means for biasing each of said plurality of weighting capacitors for storing no charge when said second voltage level is applied to its second plate;

N charge sensing means identified by respective ones of consecutive ordinal numbers first through $N^{th}$, each connected for sensing the difference between the charge on said output line identified by the same ordinal number it is and the charge on said output line identified by the ordinal number N higher and responding to that differential charge for each of said first through $(B-1)^{th}$ other bit slices to generate a respective set of first through $(B-1)^{th}$ partial weighted summation results of performing N weighted summations of said first through $M^{th}$ single-bit digital input signals; and N means for performing a weighted summation identified by respective ones of consecutive ordinal numbers first through $N^{th}$, each said means for performing a weighted summation performing a weighted summation of a respective said set of first through $(B-1)^{th}$ partial weighted summation results as sequentially generated by said charge sensing means identified by the same ordinal number, the weights afforded each of the $(B-1)$ partial weighted summation results in each said means for performing a weighted summation having the same significances as the bit slices generating each of the $(B-1)$ partial weighted summation results.

32. A system for performing N weighted summations of plural-bit digital input signals as set forth in claim 31 connected in a neural net layer with:

N non-linear processors, each having a sigmoidal transfer characteristic and receptive of a respective result of performing a weighted summations of a respective said set of first through $B^{th}$ partial weighted summation results, to generate a respective axonal response.

33. A system for performing N weighted summations of plural-bit digital input signals connected in a neural net layer, as set forth in claim 32, including:

means for digitizing the axonal responses of said first through $N^{th}$ non-linear processors.

34. A method for processing plural-bit digital input signals in a monolithic integrated circuit, said method comprising the steps of:

supplying said plural-bit digital input signals to said monolithic integrated circuit;

arranging for the bit-slicing of said plural-bit digital input signals within said monolithic integrated circuit;

processing each bit slice of said plural-bit digital input signals within said monolithic integrated circuit in a plurality of analog weighted summation circuits generating respective partial summation results, the processing of each bit slice involving the same weighted summation algorithms; and performing with further analog circuitry within said monolithic integrated circuit a respective weighted summation of the partial summation results of each said weighted summation algorithm, each of the partial summation results of each said weighted summation algorithm being weighted in accordance with the significance of the bit slice generating that partial summation result, to generate a respective final weighted summation result.

35. A method for processing plural-bit digital input signals in a monolithic integrated circuit, as set forth in claim 34, wherein said steps of processing each bit slice of said plural-bit digital input signals within said monolithic integrated circuit in a plurality of analog weighted summation circuits are done sequentially, with each said sequential step being done using the same set of analog weighted summation circuits.

36. A method for processing plural-bit digital input signals in a monolithic integrated circuit, as set forth in claim 34, including the further steps of:

non-linearly processing within said monolithic integrated circuit each said respective final weighted summation result with analog electronic circuitry of a type having a sigmoidal transfer characteristic to obtain a respective analog axonal response.

37. A method for processing plural-bit digital input signals in a monolithic integrated circuit, as set forth in claim 36, including the further steps of:

digitizing within said monolithic integrated circuit each said respective analog axonal response with respective analog-to-digital converter circuitry; and supplying said digitized analog axonal responses as respective output signals from said monolithic integrated circuit.

38. A system for performing N weighted summations of plural-bit digital input signals, M in number, identified by respective ones of consecutive ordinal numbers first through $M^{th}$, N being an integer greater than zero and M being an integer greater than one, each of said M plural-bit digital input signals having B bits in each successive word thereof, B being an integer at least two, said system comprising:

M pairs of input lines, said input lines identified by respective ones of consecutive ordinal numbers first through $2M^{th}$, each pair including input lines identified by ordinal numbers M apart and each pair being identified by the same ordinal number as the lower of the ordinal numbers identifying the input lines in said pair;

respective means for sequentially supplying bit slices of temporally aligned words of said first through $M^{th}$ digital input signals, the successive bit slices of each of the successive words of each of said first through $M^{th}$ digital input signals being consecutively ordinarily numbered first through $B^{th}$ in order of their occurrence;

means for generating a sign bit flag signal that has a first value only during sign bit slices and that has a second value during all other bit slices;

respective means respectively responding to current bits of said first through $M^{th}$ single-bit digital input signals being ONE at the same time as said sign bit flag signal has its second value, for placing a first prescribed voltage level on the input line identified by the corresponding ordinal number and placing a second prescribed voltage level on the input line identified by the ordinal number M higher;

respective means respectively responding to current bits of said first through $M^{th}$ single-bit digital input signals being ZERO at the same time as said sign bit flag has its second value, for placing said second prescribed voltage level on the input line identified by the corresponding ordinal number and placing said first prescribed voltage level on the input line identified by the ordinal number M higher;

respective means respectively responding to current bits of said first through $M^{th}$ single-bit digital input signals being ONE at the same time as said sign bit flag signal has its first value, for placing said second prescribed voltage level on the input line identified by the corresponding ordinal number and placing said first prescribed voltage level on the input line identified by the ordinal number M higher;

respective means respectively responding to current bits of said first through $M^{th}$ single-bit digital input signals being ZERO at the same time as said sign bit flag signal has its first value, for placing said first prescribed voltage level on the input line identified by the corresponding ordinal number and placing said first prescribed voltage level on the input line identified by the ordinal number M higher;

N output lines identified by respective ones of consecutive ordinal numbers first through $N^{th}$;

a plurality of weighting capacitors having respective first plates and second plates, each of said weighting capacitors having its first plate connected to one of said first through $2M^{th}$ output lines and having its second plate connected to one of said first through $N^{th}$ input lines;

N charge sensing means identified by respective ones of consecutive ordinal numbers first through $N^{th}$, each connected for sensing the charge on said output line identified by the same ordinal number it is and responding to that charge for each of said first through $B^{th}$ bit slices to generate a respective set of first through $B^{th}$ partial weighted summation results of performing N weighted summations of said first through $M^{th}$ single-bit digital input signals; and N means for performing a weighted summation identified by respective ones of consecutive ordinal numbers first through $N^{th}$, each said means for performing a weighted summation performing a weighted summation of a respective said set of first through $B^{th}$ partial weighted summation results as sequentially generated by said charge sensing means identified by the same ordinal number, the weights afforded each of the B partial weighted summation results in each said means for performing a weighted summation having the same significances as the bit slices generating each of the B partial weighted summation results.

39. A system for performing N weighted summations of plural-bit digital input signals as set forth in claim 38 connected in a neural net layer with:

N non-linear processors, each having a sigmoidal transfer characteristic and receptive of a respective result of performing a weighted summations of a respective said set of first through $B^{th}$ partial weighted summation results, to generate a respective axonal response.

40. A system for performing N weighted summations of plural-bit digital input signals connected in a neural net layer, as set forth in claim 39, including:

means for digitizing the axonal responses of said first through $N^{th}$ non-linear processors.

* * * * *